(12) United States Patent
Shahana et al.

(10) Patent No.: US 12,454,331 B2
(45) Date of Patent: Oct. 28, 2025

(54) CONTROL DEVICE FOR HUMAN-POWERED VEHICLE

(71) Applicant: Shimano Inc., Osaka (JP)

(72) Inventors: Satoshi Shahana, Osaka (JP); Toru Takayanagi, Osaka (JP); Takeshi Ueda, Osaka (JP); Atsuhiro Emura, Osaka (JP); Hayato Shimazu, Osaka (JP)

(73) Assignee: Shimano Inc., Osaka (JP)

( * ) Notice: Subject to any disclaimer, the term of this patent is extended or adjusted under 35 U.S.C. 154(b) by 203 days.

(21) Appl. No.: 18/366,948

(22) Filed: Aug. 8, 2023

(65) Prior Publication Data

US 2024/0076009 A1    Mar. 7, 2024

(30) Foreign Application Priority Data

Aug. 31, 2022 (JP) .................................. 2022-138698

(51) Int. Cl.
*B62M 6/45* (2010.01)
*B62M 9/122* (2010.01)

(52) U.S. Cl.
CPC .............. *B62M 6/45* (2013.01); *B62M 9/122* (2013.01)

(58) Field of Classification Search
CPC ................................ B62M 6/45; B62M 9/122
See application file for complete search history.

(56) References Cited

U.S. PATENT DOCUMENTS

| 5,599,244 A | * | 2/1997 | Ethington | .............. | B62M 9/123 |
| | | | | | 474/81 |
| 2013/0054066 A1 | * | 2/2013 | Watarai | .................... | B62M 6/45 |
| | | | | | 701/22 |
| 2018/0215432 A1 | * | 8/2018 | Tsuchizawa | ............. | B62M 6/50 |
| 2019/0152560 A1 | * | 5/2019 | Iino | ........................ | B62M 9/122 |

FOREIGN PATENT DOCUMENTS

| JP | 2014-151745 A | 8/2014 |
| JP | 6321557 B2 | 5/2018 |
| JP | 2022-104360 A | 7/2022 |

* cited by examiner

*Primary Examiner* — Donald J Wallace
*Assistant Examiner* — Harrison Heflin
(74) *Attorney, Agent, or Firm* — Global IP Counselors LLP; David Tarnoff

(57) ABSTRACT

A control device for a human-powered vehicle includes an electronic controller. The human-powered vehicle includes a motor that applies a propulsion force to the human-powered vehicle and a transmission that shifts a transmission ratio of the human-powered vehicle between a plurality of shift stages. The electronic controller is configured to control the motor. The electronic controller is configured to decrease an upper limit value of an output of the motor in an up-shift operation. The electronic controller is configured to decrease the upper limit value in a down-shift operation. The electronic controller is configured to control the motor so that the upper limit value in the up-shift operation performed between two predetermined ones of the shift stages that differ in the transmission ratio by one stage differs from the upper limit value in the down-shift operation performed between the two predetermined ones of the shift stages.

19 Claims, 8 Drawing Sheets

CONTROL DEVICE FOR HUMAN-POWERED VEHICLE

CROSS-REFERENCE TO RELATED APPLICATIONS

This application claims priority to Japanese Patent Application No. 2022-138698, filed on Aug. 31, 2022. The entire disclosure of Japanese Patent Application No. 2022-138698 is hereby incorporated herein by reference.

BACKGROUND

Technical Field

The present disclosure generally relates to a control device for a human-powered vehicle.

Background Information

One example of a control device for a human-powered vehicle is disclosed in Japanese Laid-Open Patent Publication No. 2014-151745 (Patent Document 1). The control device of Patent Document 1 includes a travel assist electric motor and a transmission. In a case where the travel assist electric motor assists in propulsion of the human-powered vehicle and the transmission shifts a transmission ratio, the control device decreases an output of the traveling assistance electric motor in accordance with a human driving force.

SUMMARY

An objective of the present disclosure is to provide a control device for a human-powered vehicle that controls a motor in a preferred manner in a case where the motor assists in propulsion of the human-powered vehicle and a transmission shifts a transmission ratio.

A control device in accordance with a first aspect of the present disclosure is for a human-powered vehicle. The human-powered vehicle includes a motor that applies a propulsion force to the human-powered vehicle and a transmission that shifts a transmission ratio of the human-powered vehicle between a plurality of shift stages. The control device comprises an electronic controller configured to control the motor. The electronic controller is configured to decrease an upper limit value of an output of the motor in an up-shift operation that increases the transmission ratio by shifting from one of the shift stages to another one of the shift stages. The electronic controller is configured to decrease the upper limit value in a down-shift operation that decreases the transmission ratio by shifting from one of the shift stages to another one of the shift stages. The electronic controller is configured to control the motor so that the upper limit value in the up-shift operation performed between two predetermined ones of the shift stages that differ in the transmission ratio by one stage differs from the upper limit value in the down-shift operation performed between the two predetermined ones of the shift stages.

With the control device according to the first aspect, the electronic controller decreases the upper limit value of the output of the motor in an up-shift operation and a down-shift operation. This facilitates shifting by the transmission. The control device according to the first aspect optimally controls the motor at an appropriate upper limit value of the output of the motor in each of an up-shift operation and a down-shift operation performed between the two predetermined ones of the shift stages that differ in the transmission ratio by one stage.

In accordance with a second aspect of the present disclosure, the control device according to the first aspect is configured so that the electronic controller is configured to control the motor so as not to decrease the upper limit value in a case where the transmission ratio is shifted to a smallest one of the shift stages.

With the control device according to the second aspect, the electronic controller controls the motor so as not to decrease the upper limit value of the output of the motor in a case where the shifting of the transmission ratio relates to the smallest one of the shift stages. Thus, in a case where the load applied to the transmission is small and shifting tends to occur, the rider will not notice a decrease in the assist force of the motor.

In accordance with a third aspect of the present disclosure, the control device according to the first or second aspect is configured so that the electronic controller is configured to control the motor so as not to decrease the upper limit value in the up-shift operation performed between the two predetermined ones of the shift stages.

With the control device according to the third aspect, the electronic controller controls the motor so as not to decrease the upper limit value of the output of the motor in an up-shift operation performed between the two predetermined ones of the shift stages. Thus, the rider will not notice a decrease in the assist force of the motor in an up-shift operation performed between the two predetermined ones of the shift stages.

In accordance with a fourth aspect of the present disclosure, the control device according to any one of the first to third aspects is configured so that the electronic controller is configured to control the motor so that the upper limit value in the up-shift operation performed between the two predetermined ones of the shift stages is less than the upper limit value in the down-shift operation performed between the two predetermined ones of the shift stages.

With the control device according to the fourth aspect, the electronic controller sets the upper limit value of the output of the motor in an up-shift operation performed between the two predetermined ones of the shift stages to be less than the upper limit value of the output of the motor in a down-shift operation performed between the two predetermined ones of the shift stages. This facilitates the shifting by the transmission in the up-shift operation performed between the two predetermined ones of the shift stages. Further, the rider will not notice a decrease in the assist force of the motor in the down-shift operation performed between the two predetermined ones of the shift stages.

In accordance with a fifth aspect of the present disclosure, the control device according to any one of the first to third aspects is configured so that the electronic controller is configured to control the motor so that the upper limit value in the down-shift operation performed between the two predetermined ones of the shift stages is less than the upper limit value in the up-shift operation performed between the two predetermined ones of the shift stages.

With the control device according to the fifth aspect, the electronic controller sets the upper limit value of the output of the motor in a down-shift operation performed between the two predetermined ones of the shift stages to be less than the upper limit value of the output of the motor in an up-shift operation performed between the two predetermined ones of the shift stages. This facilitates the shifting by the transmission in the down-shift operation performed between the two predetermined ones of the shift stages. Further, the rider will not notice a decrease in the assist force of the motor in the up-shift operation performed between the two predetermined ones of the shift stages.

In accordance with a sixth aspect of the present disclosure, the control device according to any one of the first to third aspects is configured so that the shift stages include two first predetermined shift stages that differ in the transmission ratio by one stage and two second predetermined shift stages that differ in the transmission ratio by one stage. The electronic controller is configured to control the motor so that the upper limit value in the up-shift operation performed between the two first predetermined shift stages is less than the upper limit value in the down-shift operation performed between the two first predetermined shift stages. The electronic controller is configured to control the motor so that the upper limit value in the down-shift operation performed between the two second predetermined shift stages is less than the upper limit value in the up-shift operation performed between the two second predetermined shift stages.

With the control device according to the sixth aspect, the electronic controller sets the upper limit value of the output of the motor in an up-shift operation performed between the two first predetermined shift stages to be less than the upper limit value of the output of the motor in a down-shift operation performed between the two first predetermined shift stages. This facilitates the shifting by the transmission in the up-shift operation performed between the two first predetermined shift stages. Further, the rider will not notice a decrease in the assist force of the motor in the down-shift operation performed between the two first predetermined shift stages. With the control device according to the sixth aspect, the electronic controller sets the upper limit value of the output of the motor in a down-shift operation performed between the two second predetermined shift stages to be less than the upper limit value of the output of the motor in an up-shift operation performed between the two second predetermined shift stages. This facilitates the shifting by the transmission in the down-shift operation performed between the two second predetermined shift stages. Further, the rider will not notice a decrease in the assist force of the motor in the up-shift operation performed between the two second predetermined shift stages.

In accordance with a seventh aspect of the present disclosure, the control device according to the sixth aspect is configured so that the transmission ratio of each of the two first predetermined shift stages is less than the transmission ratio of each of the two second predetermined shift stages.

With the control device according to the seventh aspect, in the two first predetermined shift stages that have smaller transmission ratios than the two second predetermined shift stages, the electronic controller sets the upper limit value of the output of the motor in an up-shift operation to be less than the upper limit value in a down-shift operation.

In accordance with an eighth aspect of the present disclosure, the control device according to any one of the first to seventh aspects is configured so that the electronic controller is configured to vary the upper limit value and decrease the output of the motor by controlling the motor so as to gradually decrease the output of the motor over a first period.

With the control device according to the eighth aspect, the electronic controller gradually decreases the output of the motor over the first period. Thus, the rider will not feel awkward as the output of the motor decreases.

In accordance with a ninth aspect of the present disclosure, the control device according to the eighth aspect is configured so that the first period is a first time period. The first time period is 0.05 seconds or greater and 0.3 seconds or less.

With the control device according to the ninth aspect, the electronic controller gradually decreases the output of the motor over the first time period. Thus, the rider will not feel awkward as the output of the motor decreases.

In accordance with a tenth aspect of the present disclosure, the control device according to any one of the first to ninth aspects is configured so that the electronic controller is configured to control the motor so that in a case where the upper limit value is decreased to decrease the output of the motor, if a predetermined period elapses after decreasing the output of the motor, the upper limit value is increased to the upper limit value that was set until immediately before the upper limit value was decreased.

With the control device according to the tenth aspect, if the predetermined period elapses after decreasing the output of the motor, the electronic controller increases the upper limit value to the upper limit value that was set immediately before the upper limit value was decreased. Thus, after the predetermined period elapses, the electronic controller controls the motor at the same upper limit value as before the upper limit value was decreased.

In accordance with an eleventh aspect of the present disclosure, the control device according to the tenth aspect is configured so that the predetermined period includes a period during which a rotational amount of a wheel of the human-powered vehicle reaches a predetermined rotational amount. The predetermined rotational amount is 30 degrees or greater and less than 460 degrees.

With the control device according to the eleventh aspect, the electronic controller controls the motor with the same upper limit value as before the upper limit value was decreased in a case where the rotational amount of the wheel of the human-powered vehicle reaches the predetermined rotational amount.

In accordance with a twelfth aspect of the present disclosure, the control device according to the tenth or eleventh aspect is configured so that the electronic controller is configured to increase the upper limit value and increase the output of the motor by gradually increasing the output of the motor over a second period.

With the control device according to the twelfth aspect, the electronic controller gradually increases the output of the motor over the second period. Thus, the rider will not feel awkward as the output of the motor increases.

In accordance with a thirteenth aspect of the present disclosure, the control device according to the twelfth aspect is configured so that the second period is a second time period. The second time period is 0.05 seconds or greater and 0.2 seconds or less.

With the control device according to the thirteenth aspect, the electronic controller gradually increases the output of the motor over the second time period. Thus, the rider will not feel awkward as the output of the motor increases.

In accordance with a fourteenth aspect of the present disclosure, the control device according to any one of the first to thirteenth aspects is configured so that the electronic controller is configured to vary the upper limit value by controlling the motor so as to decrease the upper limit value as a human driving force applied to the human-powered vehicle increases.

With the control device according to the fourteenth aspect, the electronic controller decreases the upper limit value of the output of the motor as the human driving force increases. This limits reduction in the shifting performance of the transmission.

In accordance with a fifteenth aspect of the present disclosure, the control device according to any one of the first to thirteenth aspects is configured so that the electronic controller is configured to control the transmission so that the transmission starts an action in accordance with a peak time of a human driving force applied to the human-powered vehicle.

With the control device according to the fifteenth aspect, the electronic controller starts an action of the transmission in accordance with the peak time of the human driving force. This shifts the transmission ratio at a time appropriate for the human driving force.

In accordance with a sixteenth aspect of the present disclosure, the control device according to the fifteenth aspect is configured so that the transmission includes rotational bodies and a derailleur that is configured to shift the transmission ratio by moving a linking body from one of the rotational bodies to another one of the rotational bodies. At least one of the rotational bodies includes at least two shifting facilitation regions in a circumferential direction. The at least two shifting facilitation regions facilitate movement of the linking body with the derailleur from the one of the rotational bodies to the other one of the rotational bodies. The electronic controller is configured to control the transmission so as to start an action of the transmission in accordance with the peak time and a distance from one of the at least two shifting facilitation regions to an adjacent one of the at least two shifting facilitation regions. The electronic controller is configured to control the motor so as to decrease the upper limit value in accordance with the peak time and the distance.

With the control device according to the sixteenth aspect, the electronic controller starts an action of the transmission at a time appropriate for the peak time and the distance from one of the at least two shifting facilitation regions to the adjacent one of the at least two shifting facilitation regions. Further, the electronic controller decreases the upper limit value of the output of the motor.

In accordance with a seventeenth aspect of the present disclosure, the control device according to any one of the tenth to thirteenth aspects is configured so that the transmission includes rotational bodies and a derailleur that is configured to change the shift stage by moving a linking body from one of the rotational bodies to another one of the rotational bodies. At least one of the rotational bodies includes at least two shifting facilitation regions in a circumferential direction. The at least two shifting facilitation regions facilitate movement of the linking body with the derailleur from the one of the rotational bodies to the other one of the rotational bodies. The predetermined period is determined in accordance with a length of where the linking body engages the other one of the rotational bodies and a distance from one of the at least two shifting facilitation regions to an adjacent one of the at least two shifting facilitation regions.

The control device according to the seventeenth aspect increases the upper limit value of the output of the motor after a period corresponding to the predetermined period that is determined in accordance with the length of where the linking body engages the adjacent one of the rotational bodies and the distance from one of the at least two shifting facilitation regions to the adjacent one of the at least two shifting facilitation regions.

In accordance with an eighteenth aspect of the present disclosure, the control device according to the sixteenth or seventeenth aspect is configured so that the derailleur includes a rear derailleur.

With the control device according to the eighteenth aspect, the electronic controller shifts the transmission ratio with the rear derailleur in a preferred manner.

A control device in accordance with a nineteenth aspect of the present disclosure is for a human-powered vehicle. The human-powered vehicle includes a motor that applies a propulsion force to the human-powered vehicle and a transmission that shifts a transmission ratio of the human-powered vehicle between a plurality of shift stages. The control device comprises an electronic controller configured to control the motor. The electronic controller is configured to decrease an upper limit value of an output of the motor in a case where the transmission ratio is increased in a first group of at least two of the shift stages by changing one of the shift stages in the first group to another one of the shift stages in the first group. The electronic controller is configured to decrease the upper limit value of the output of the motor in a case where the transmission ratio is decreased in a second group of at least two of the shift stages by changing one of the shift stages in the second group to another one of the shift stages in the second group. At least one of the at least two shift stages in the first group differs from at least one of the at least two shift stages in the second group.

With the control device according to the nineteenth aspect, in each of the first group and the second group, the electronic controller decreases the upper limit value of the output of the motor in a case where one of the shift stages is changed to another one of the shift stages. In this manner, the electronic controller optimally controls the motor to facilitate shifting of the transmission ratio in each of the first group and the second group.

The control device for the human-powered vehicle in accordance with the present disclosure optimally controls the motor in a case where the motor assists in propulsion of the human-powered vehicle and the transmission shifts the transmission ratio.

BRIEF DESCRIPTION OF THE DRAWINGS

Referring now to the attached drawings which form a part of this original disclosure.

DETAILED DESCRIPTION

Figure 1:
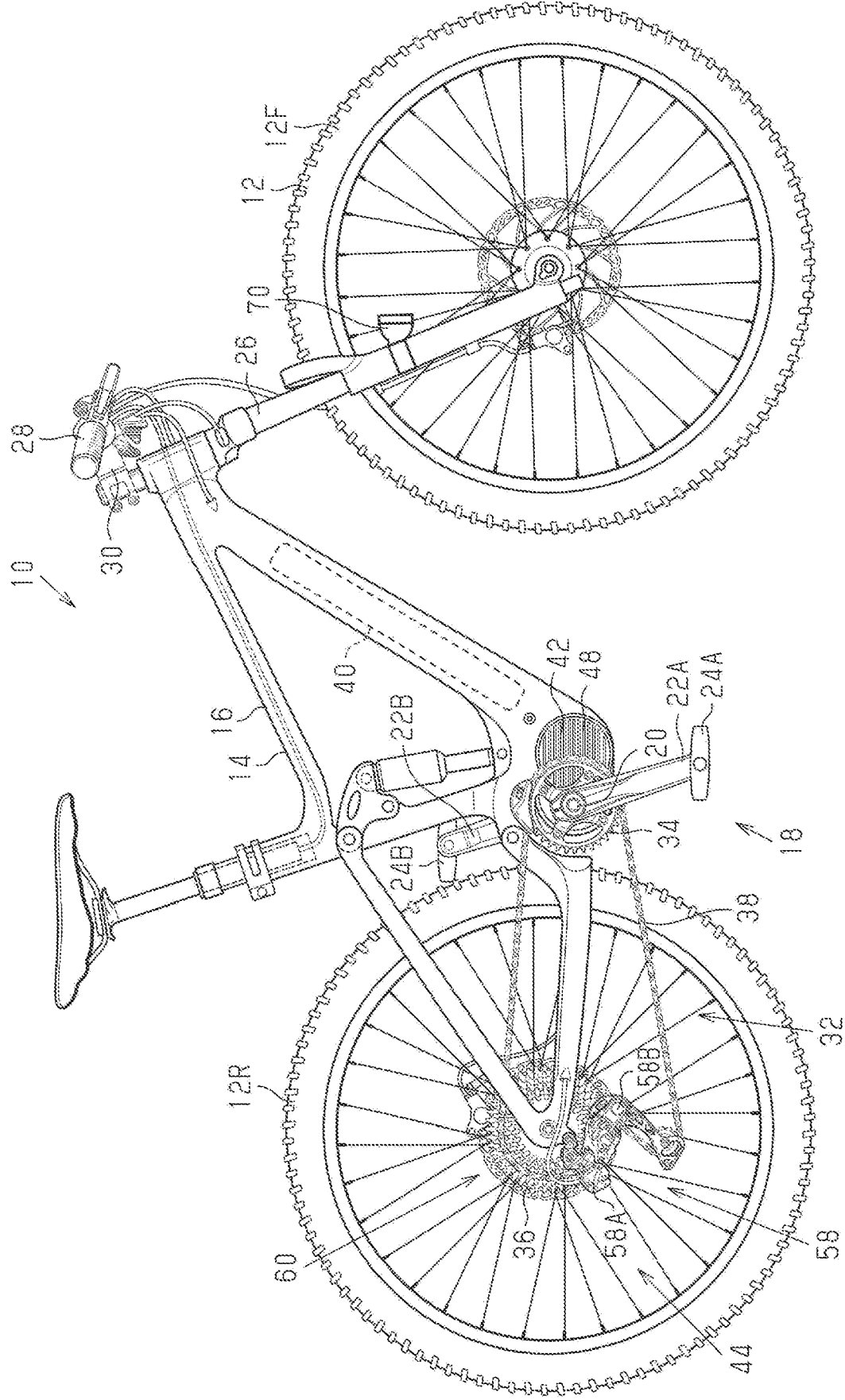
FIG. 1 is a side elevational view of a human-powered vehicle including a human-powered vehicle control device in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A control device 80 for a human-powered vehicle will now be described with reference to FIGS. 1 to 8. The human-powered vehicle is a vehicle that includes at least one wheel and can be driven by at least a human driving force. Examples of the human-powered vehicle include various types of bicycles such as a mountain bike, a road bike, a city bike, a cargo bike, a handcycle, and a recumbent bike. There is no limit to the number of wheels of the human-powered vehicle. The human-powered vehicle also includes, for example, a unicycle or a vehicle having two or more wheels. The human-powered vehicle is not limited to a vehicle that can be driven only by a human driving force. The human-powered vehicle includes an electric bicycle (E-bike) that uses a drive force of an electric motor for propulsion in addition to the human driving force. The E-bike includes an electric assist bicycle that assists in propulsion with an electric motor. In each embodiment described hereafter, the human-powered vehicle will be described as an electric assist bicycle.

A human-powered vehicle 10 includes at least one wheel 12 and a vehicle body 14. The at least one wheel 12 includes a front wheel 12F and a rear wheel 12R. The vehicle body 14 includes a frame 16. For example, a saddle is attached to the frame 16.

The human-powered vehicle 10 further includes, for example, a crank 18 to which a human driving force is input. The crank 18 includes, for example, a crank axle 20 and two crank arms 22A and 22B. The crank axle 20 is rotatable relative to the frame 16. For example, the crank arm 22A is provided at a first axial end of the crank axle 20. For example, the crank arm 22B is provided at a second axial end of the crank axle 20. For example, a pedal 24A is coupled to the crank arm 22A. For example, a pedal 24B is coupled to the crank arm 22B. A front fork 26 is connected to the frame 16. The front wheel 12F is attached to the front fork 26. A handlebar 28 is coupled to the front fork 26 by a stem 30. The rear wheel 12R is supported by the frame 16.

In the present embodiment, the crank 18 is connected to the rear wheel 12R by a drive mechanism 32. The rear wheel 12R is driven by the rotation of the crank axle 20. At least one of the front wheel 12F and the rear wheel 12R can be connected to the crank 18 by the drive mechanism 32. The drive mechanism 32 includes at least one first rotational body 34 coupled to the crank axle 20. The at least one first rotational body 34 includes, for example, a front sprocket. The at least one first rotational body 34 can include a pulley or a bevel gear. The crank axle 20 can be connected to the front sprocket by a one-way clutch.

The drive mechanism 32 further includes at least one second rotational body 36 and a linking body 38. The linking body 38 is configured to transmit the rotational force of the at least one first rotational body 34 to the at least one second rotational body 36. The linking body 38 includes, for example, a chain. The linking body 38 can include a belt or a shaft. The at least one second rotational body 36 includes, for example, a rear sprocket. The at least one second rotational body 36 can include a pulley or a bevel gear. The chain is wound around, for example, the front sprocket and the rear sprocket. The at least one second rotational body 36 is coupled to, for example, the rear wheel 12R. The rear wheel 12R is, for example, configured to be rotated as the at least one second rotational body 36 rotates.

The at least one second rotational body 36 and the rear wheel 12R are connected by, for example, a first one-way clutch. The first one-way clutch includes, for example, at least one of a roller clutch, a sprag clutch, and a ratchet clutch. The first one-way clutch is configured to transmit driving force from the at least one second rotational body 36 to the rear wheel 12R in a case where the at least one second rotational body 36 is rotated in accordance with forward rotation of the at least one first rotational body 34. Further, the first one-way clutch is configured to allow relative rotation of the rear wheel 12R and the at least one second rotational body 36 in a case where the speed at which the rear wheel 12R rotates forward is greater than the speed at which the at least one second rotational body 36 rotates forward.

The human-powered vehicle 10 further includes, for example, a battery 40. The battery 40 includes one or more battery cells. Each battery cell includes a rechargeable battery. The battery 40 is configured to supply electric power to electronic devices provided on the human-powered vehicle 10, such as the control device 80, a motor 42, and a transmission 44. The battery 40 is, for example, connected to the control device 80 in a manner allowing for wired communication or wireless communication. The battery 40 is configured to establish communication with the control device 80 through, for example, power line communication (PLC), Controller Area Network (CAN), or universal asynchronous receiver/transmitter (UART).

The human-powered vehicle 10 includes the motor 42 that applies a propulsion force to the human-powered vehicle 10 and the transmission 44 that shifts a transmission ratio of the human-powered vehicle 10 between a plurality of shift stages.

The motor 42 is, for example, configured to drive the linking body 38. The motor 42 is, for example, configured to apply a propulsion force to the human-powered vehicle 10 in accordance with a human driving force. The motor 42 includes, for example, one or more electric motors. The electric motor of the motor 42 is, for example, a brushless motor. The motor 42 is, for example, configured to transmit a rotational force to at least one member included in a power transmission path of the human driving force extending from the pedals 24A, 24B to the at least one second rotational body 36. The motor 42 includes, for example, an output shaft 42A. The output shaft 42A is, for example, configured to transmit the rotational force of the motor 42 to at least one member included in the power transmission path of the human driving force extending from the pedals 24A, 24B to the at least one second rotational body 36.

In the present embodiment, the motor 42 is, for example, configured to drive the linking body 38 via the at least one first rotational body 34. For example, the motor 42 is provided on the frame 16 and configured to transmit a rotational force to the at least one first rotational body 34. The motor 42 can have any configuration as long as the motor 42 is capable of driving the linking body 38. The motor 42 can be configured to drive the linking body 38 via the second rotational body 36. The motor 42 can be provided in a hub of the human-powered vehicle 10 and configured to transmit a rotational force to the second rotational body 36.

The human-powered vehicle 10 further includes a housing 46 in which the motor 42 is provided. The motor 42 and the housing 46 form a drive unit 48. The housing 46 is attached to the frame 16. The housing 46 supports the crank axle 20 in a rotatable manner. The motor 42 can be configured to transmit a rotational force to the linking body 38 without the at least one first rotational body 34. In a case where the motor 42 is configured to transmit a rotational force to the linking body 38 without the at least one first rotational body 34, for example, a sprocket that engages the linking body 38 is provided on the output shaft 42A or a member to which the force from the output shaft 42A is transmitted.

The drive unit 48 further includes, for example, an output unit 50. The output unit 50 is, for example, arranged coaxially with the crank axle 20. The output unit 50 is, for example, configured to receive a human driving force and the output of the motor 42. The output unit 50 is, for example, configured to receive the rotational force of the crank axle 20 and the output of the motor 42. The output unit 50 is, for example, cylindrical. The output unit 50 is, for example, provided on an outer circumferential portion of the crank axle 20 about a rotational axis C1 of the crank axle 20. The at least one first rotational body 34 is, for example, coupled to a first end 50A of the output unit 50 in a manner rotatable integrally with the output unit 50.

The drive unit 48 includes, for example, a speed reducer 52. The speed reducer 52 is, for example, provided between the motor 42 and the power transmission path of the human driving force. The speed reducer 52 includes, for example, at least one speed reducing unit. The at least one speed reducing unit includes, for example, a first speed reducing unit 52A, a second speed reducing unit 52B, and a third speed reducing unit 52C. The number of speed reducing units included in the speed reducer 52 can be one, two, four or more.

The first speed reducing unit 52A receives, for example, the rotational torque of the motor 42. The first speed reducing unit 52A includes, for example, two gears meshed with each other. The first speed reducing unit 52A can include a belt and pulleys instead of the gears. The first speed reducing unit 52A can include a chain and sprockets instead of the gears.

The second speed reducing unit 52B receives, for example, the rotational torque of the motor 42 via the first speed reducing unit 52A. The second speed reducing unit 52B includes, for example, two gears meshed with each other. The second speed reducing unit 52B can include a belt and pulleys instead of the gears. The second speed reducing unit 52B can include a chain and sprockets instead of the gears.

The third speed reducing unit 52C receives, for example, the rotational torque of the motor 42 via the second speed reducing unit 52B. The third speed reducing unit 52C transmits, for example, the rotational torque of the motor 42 to the output unit 50. The third speed reducing unit 52C includes, for example, two gears meshed with each other. The third speed reducing unit 52C can include a belt and pulleys instead of the gears. The third speed reducing unit 52C can include a chain and sprockets instead of the gears.

The drive unit 48 further includes, for example, a second one-way clutch 54. The second one-way clutch 54 is, for example, provided in a power transmission path from the crank axle 20 to the at least one first rotational body 34. The second one-way clutch 54 is, for example, provided between the crank axle 20 and the output unit 50.

The second one-way clutch 54 is, for example, configured to rotate the at least one first rotational body 34 forward in a case where the crank axle 20 is rotated forward. The second one-way clutch 56 is, for example, further configured to allow relative rotation of the crank axle 20 and the at least one first rotational body 34 in a case where the crank axle 20 is rotated rearward. The second one-way clutch 54 includes, for example, at least one of a roller clutch, a sprag clutch, and a ratchet clutch.

The drive unit 48 further includes, for example, a third one-way clutch 56. The third one-way clutch 56 is, for example, provided in a power transmission path extending from the motor 42 to the at least one first rotational body 34. The third one-way clutch 56 is, for example, provided on the speed reducer 52.

The third one-way clutch 56 is, for example, configured to transmit the rotational force of the motor 42 to the output unit 50. The third one-way clutch 56 is, for example, configured to restrict transmission of the rotational force of the crank axle 20 to the motor 42 in a case where the crank axle 20 is rotated forward. The third one-way clutch 56 includes, for example, at least one of a roller clutch, a sprag clutch, and a ratchet clutch.

The transmission 44 includes, for example, a transmission device 58. The transmission device 58 is, for example, provided in the transmission path of the human driving force in the human-powered vehicle 10, and is configured to shift a transmission ratio. The transmission ratio is, for example, a ratio of the rotational speed of the wheel 12 to the rotational speed of the crank axle 20. The rotational speed of the wheel 12 includes, for example, the rotational speed of the drive wheel. The transmission device 58 includes, for example, at least one of a derailleur 58A and an internal transmission device.

In a case where the transmission device 58 includes an internal transmission device, for example, the internal transmission device is provided in a hub of the rear wheel 12R. In the present embodiment, the transmission device 58 includes the derailleur 58A. In a case where the transmission device 58 includes the derailleur 58A, the linking body 38 includes a chain. The linking body 38 can include a belt. The transmission device 58 includes, for example, an electric actuator. The electric actuator is, for example, configured to actuate the derailleur 58A.

The transmission 44 includes, for example, rotational bodies 60 and the derailleur 58A. The derailleur 58A is configured to shift the transmission ratio by moving the linking body 38 from one of the rotational bodies 60 to another one of the rotational bodies 60. The derailleur 58A is, for example, configured to move the linking body 38 engaged with one of the rotational bodies 60 to another one of the rotational bodies 60. The derailleur 58A is, for example, configured to operate the linking body 38 and shift the transmission ratio of the rotational speed of the wheel 12 to the rotational speed of the crank axle 20. The rotational bodies 60 include, for example, sprockets. The derailleur 58A is, for example, configured to move the linking body 38 engaged with one of the sprockets to another one of the sprockets.

The derailleur 58A is, for example, configured to operate the linking body 38 and shift the transmission ratio of the rotational speed of the wheel 12 to the rotational speed of the crank axle 20. The derailleur 58A is, for example, provided in the transmission path of the human driving force in the human-powered vehicle 10 and is configured to shift the transmission ratio. The derailleur 58A shifts the transmission ratio by, for example, operating the linking body 38 and changing the engagement state of the rotational bodies 60 and the linking body 38. The relationship of the transmission ratio, the rotational speed of the wheel 12, and the rotational speed of the crank axle 20 satisfies the following Equation (1). In Equation (1), the term "R" represents the transmission ratio. In Equation (1), the term "W" represents the rotational speed of the wheel 12. In Equation (1), the term "C" represents the rotational speed of the crank axle 20.

$$R=W(rpm)/C(rpm) \qquad \text{Equation (1):}$$

The derailleur 58A can shift the transmission ratio by, for example, changing the shift stage. The derailleur 58A is, for example, configured to perform an up-shift operation that increases the transmission ratio by shifting from one of the shift stages to another one of the shift stages. The derailleur 58A is, for example, configured to perform a down-shift operation that decreases the transmission ratio by shifting from one of the shift stages to another one of the shift stages.

The derailleur 58A is, for example, configured to operate the linking body 38 to shift from one of the shift stages to another one of the shift stages. The shift stages are set in accordance with, for example, at least one of the rotational bodies 60. For example, a different transmission ratio is set to each shift stage. For example, the transmission ratio increases as the shift stage becomes greater.

The at least one first rotational body 34 includes, for example, a plurality of first rotational bodies 34. The at least one second rotational body 36 includes, for example, a plurality of second rotational bodies 36. The rotational bodies 60 include, for example, at least the plurality of first rotational bodies 34 or the plurality of second rotational bodies 36. The first rotational bodies 34 include, for example, a plurality of first sprockets. The second rotational bodies 36 include, for example, a plurality of second sprockets. The rotational bodies 60 include, for example, at least the plurality of first sprockets or the plurality of second sprockets.

In a case where the rotational bodies 60 include the first sprockets and the second sprockets, for example, the shift stage is set in accordance with a combination of one of the first sprockets and one of the second sprockets. In a case where the at least one first rotational body 34 includes a single first sprocket, and the rotational bodies 60 include multiple second sprockets, the shift stage is set in accordance with, for example, a combination of the single first sprocket and one of the second sprockets. In a case where the rotational bodies 60 include multiple first sprockets, and the at least one second rotational body 36 includes a single second sprocket, the shift stage is set in accordance with, for example, a combination of one of the first sprockets and the single second sprocket.

The derailleur 58A moves, for example, the chain engaged with one of the sprockets to another one of the sprockets. The derailleur 58A includes, for example, a rear derailleur 58B. In a case where the derailleur 58A includes the rear derailleur 58B, and the rotational bodies 60 include second sprockets, one of the second sprockets having the least teeth is selected to implement, for example, the largest shift stage obtainable by the derailleur 58A. In a case where the derailleur 58A includes the rear derailleur 58B, and the rotational bodies 60 include second sprockets, one of the second sprockets having the most teeth is selected to implement, for example, the smallest shift stage obtainable by the derailleur 58A.

In a case where the derailleur 58A includes the rear derailleur 58B, for example, the number of second sprockets is two or more and twenty or less. In a case where the derailleur 58A includes the rear derailleur 58B, for example, the number of second sprockets is twelve.

The derailleur 58A can include a front derailleur. In a case where the derailleur 58A includes the front derailleur, and the rotational bodies 60 include first sprockets, one of the first sprockets having the least teeth is selected to implement, for example, the smallest shift stage obtainable by the derailleur 58A. In a case where the derailleur 58A includes the front derailleur, and the rotational bodies 60 include first sprockets, one of the first sprockets having the most teeth is selected to implement, for example, the largest shift stage obtainable by the derailleur 58A.

In a case where the derailleur 58A includes the front derailleur, for example, the number of first sprockets is two or more and three or less. In a case where the derailleur 58A includes the front derailleur, for example, the number of first sprockets is two.

At least one of the rotational bodies 60 includes at least two shifting facilitation regions 62 in a circumferential direction. The at least two shifting facilitation regions 62 are arranged in, for example, each one of the first rotational bodies 34 and/or each one of the second rotational bodies 36. The at least two shifting facilitation regions 62 are regions that facilitate movement of the linking body 38 with the derailleur 58A from one of the rotational bodies 60 to an adjacent one of the rotational bodies 60.

In a case where the at least two shifting facilitation regions 62 are arranged in each one of the second rotational bodies 36, for example, the at least two shifting facilitation regions 62 can differ in every one of the second rotational bodies 36. Alternatively, the at least two shifting facilitation regions can be the same in at least two of the second rotational bodies 36. At least one of the second rotational bodies 36 does not have to include the at least two shifting facilitation regions 62. For example, the smallest one of the second sprockets does not include the at least two shifting facilitation regions 62, and the other second sprockets each include the at least two shifting facilitation regions 62.

In a case where the at least two shifting facilitation regions 62 are arranged in each one of the second rotational bodies 36, the at least two shifting facilitation regions 62 include, for example, a first shifting facilitation region 62A and a second shifting facilitation region 62B. The first shifting facilitation region 62A facilitates, for example, movement of the chain from one of the second sprockets to another one of the second sprockets. The first shifting facilitation region 62A facilitates, for example, an increase in the shift stage. The first shifting facilitation region 62A facilitates, for example, movement of the chain from one of the second sprockets having a larger number of teeth to another one of the second sprockets having a smaller number of teeth. The first shifting facilitation region 62A facilitates, for example, an up-shift operation.

The second shifting facilitation region 62B facilitates, for example, movement of the chain from the other one of the second sprockets to the one of the second sprockets. The second shifting facilitation region 62B facilitates, for example, a decrease in the shift stage. The second shifting facilitation region 62B facilitates, for example, movement of the chain from one of the second sprockets having a smaller number of teeth to another one of the second sprockets having a larger number of teeth. The second shifting facilitation region 62B facilitates, for example, a down-shift operation.

In a case where the at least two shifting facilitation regions 62 are arranged in each one of the first rotational bodies 34, for example, the at least two shifting facilitation regions 62 can differ in every one of the first rotational bodies 34. Alternatively, the at least two shifting facilitation regions can be the same in at least two of the first rotational bodies 34. At least one of the first rotational bodies 34 does not have to include the at least two shifting facilitation regions 62. For example, the smallest one of the first sprockets does not include the at least two shifting facilitation regions 62, and the other first sprockets each include the at least two shifting facilitation regions 62.

In a case where the at least two shifting facilitation regions 62 are arranged in each one of the first rotational bodies 34, the at least two shifting facilitation regions 62 include, for example, a third shifting facilitation region and a fourth shifting facilitation region. The third shifting facilitation region facilitates, for example, movement of the chain from one of the first sprockets to another one of the first sprockets. The third shifting facilitation region facilitates, for example, an increase in the shift stage. The third shifting facilitation region facilitates, for example, movement of the chain from one of the first sprockets having a smaller number of teeth to another one of the first sprockets having a larger number of teeth. The third shifting facilitation region facilitates, for example, an up-shift operation.

The fourth shifting facilitation region facilitates, for example, movement of the chain from the other one of the first sprockets to the one of the first sprockets. The fourth shifting facilitation region facilitates, for example, a decrease in the shift stage. The fourth shifting facilitation region facilitates, for example, movement of the chain from one of the first sprockets having a larger number of teeth to another one of the first sprockets having a smaller number of teeth. The fourth shifting facilitation region facilitates, for example, a down-shift operation.

Figure 4:
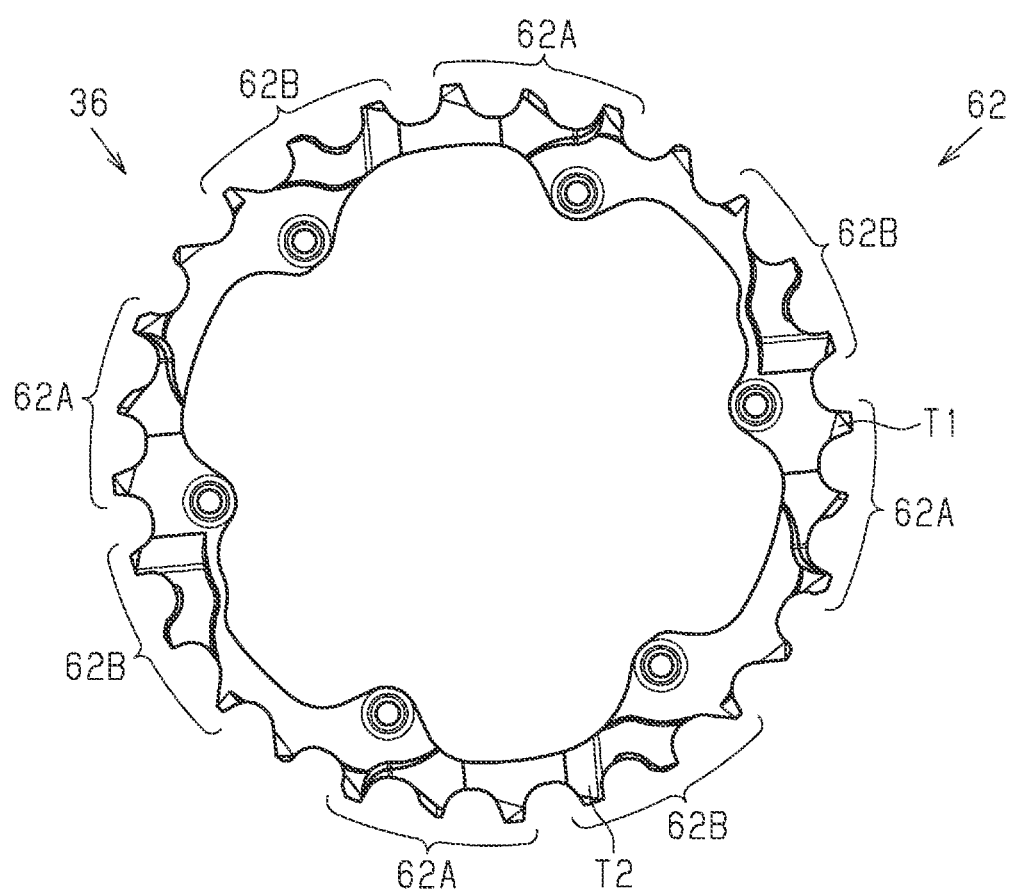
FIG. 4 is a side elevational view of one of at least one second rotational body shown in FIG. 1.

FIG. 4 shows one of the second rotational bodies 36. The one of the second rotational bodies 36 shown in FIG. 4 includes, for example, four first shifting facilitation regions 62A and four second shifting facilitation regions 62B. For example, the four first shifting facilitation regions 62A and the four second shifting facilitation regions 62B are alternately provided in the circumferential direction of the second rotational body 36.

The human-powered vehicle 10 further includes, for example, an operating unit 64 configured to operate the transmission device 58. The operating unit 64 is provided on, for example, the handlebar 28. The operating unit 64 can be connected to the transmission device 58 by a Bowden cable or the like. Alternatively, the operating unit 64 can be electrically connected to the transmission device 58 in a manner allowing for communication. In a case where the operating unit 64 is electrically connected to the transmission device 58 in a manner allowing for communication, the transmission device 58 can include, for example, an electric actuator.

The human-powered vehicle 10 can further include a display unit 66. The display unit 66 includes, for example, a display. The display unit 66 can include a cycle computer. The display includes, for example, a liquid crystal display. The display can include a segment display or an organic electro-luminescence (EL) display. The display unit 66 can include a light-emitter such as a light-emitting diode (LED).

Figure 2:
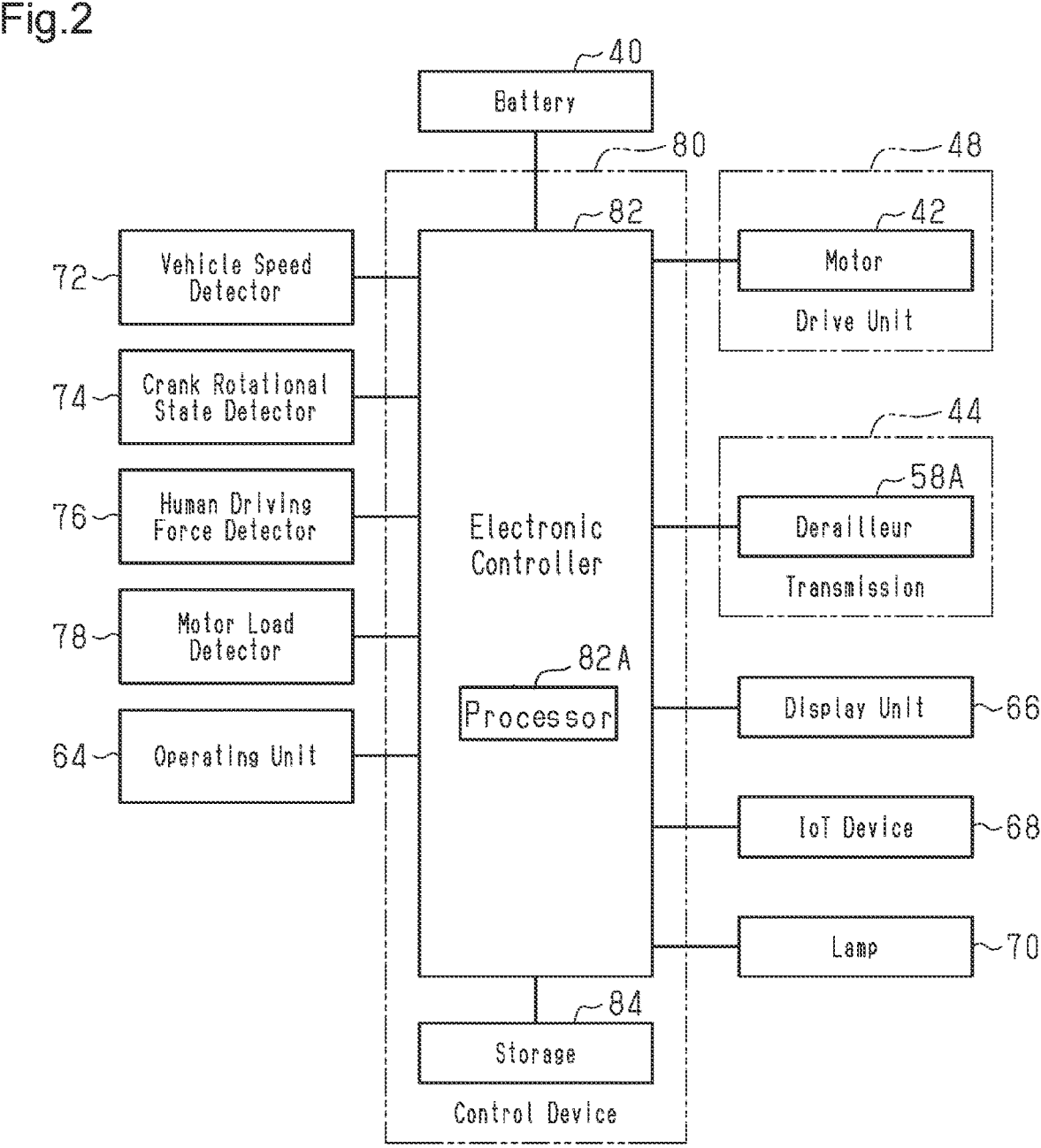
FIG. 2 is a block diagram showing the electrical configuration of the human-powered vehicle shown in FIG. 1.
Figure 3:
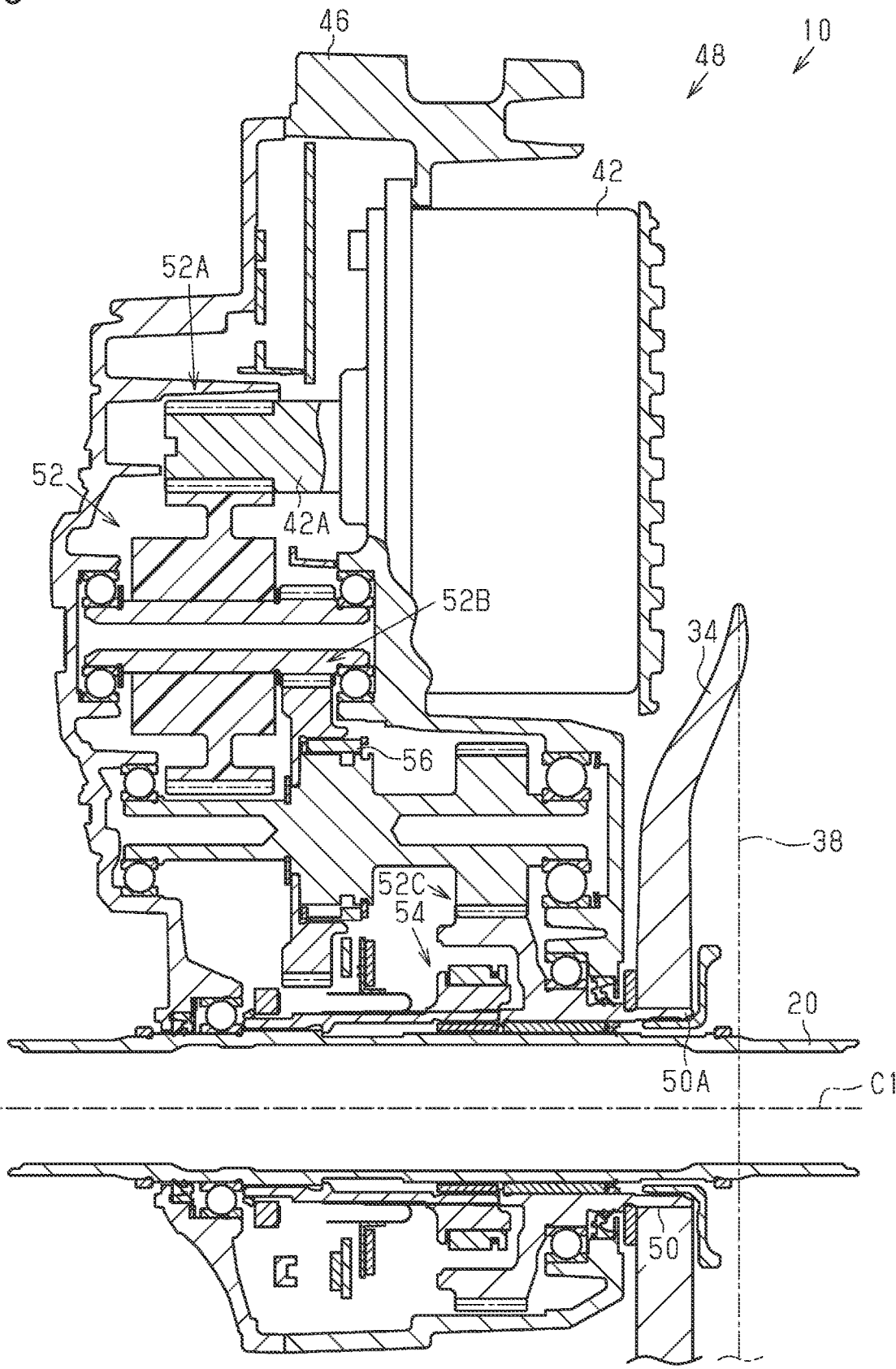
FIG. 3 is a cross-sectional view of a drive unit for the human-powered vehicle shown in FIG. 1.

As seen in FIG. 2, the human-powered vehicle 10 further includes an electronic controller 82. In particular, the control device 80 of the human-powered vehicle 10 includes the electronic controller 82. The electronic controller 82 is configured to receive input signals from various detectors as explained below. The electronic controller 82 is configured to control the display unit 66 to show display information. The electronic controller 82 is configured to control other components as explained below. The display unit 66 shows, for example, the display information on the display. The display unit 66 is, for example, configured to be connected to the electronic controller 82 in a manner allowing for wired communication or wireless communication. The display information includes, for example, at least one of a graph, a numerical value, a gauge, a text, and light.

The display unit 66 can include a speaker instead of or in addition to the display. The speaker issues the display information by, for example, sound. In a case where the display unit 66 includes a speaker, the display information includes, for example, a voice, a melody, a beeping sound, and the like.

The human-powered vehicle 10 can further include at least one Internet of Things (IoT) device 68. The at least one IoT device 68 is connected to, for example, the internet. The at least one IoT device 68 includes, for example, a plurality of IoT devices 68. In a case where the at least one IoT device 68 includes a plurality of IoT devices 68, the IoT devices 68 are configured to establish communication with one another via the Internet. The at least one IoT device 68 includes, for example, various types of electrical components provided on the human-powered vehicle 10. The electrical components include, for example, at least one of the battery 40, the drive unit 48, the transmission 44, the display unit 66, a lamp 70, an electric adjustable seatpost, an electric suspension, an electric brake, and a cycle computer.

The human-powered vehicle 10 can further include the lamp 70. The lamp 70 includes, for example, a front lamp. The front lamp is attached to, for example, the front fork 26. The lamp 70 can include, for example, a tail lamp instead of or in addition to the front lamp. The tail lamp is attached to, for example, a seat stay of the human-powered vehicle 10. For example, the lamp 70 can be supplied with the electric power from the battery 40 or a battery that differs from the battery 40.

As seen in FIG. 2, the human-powered vehicle 10 further includes one or more detectors for detecting one or more operating conditions of the human-powered vehicle 10. The term "detector" as used herein refers to a hardware device or instrument designed to detect the presence or absence of a particular event, object, substance, or a change in its environment, and to emit a signal in response. The term "detector" as used herein do not include a human being.

The human-powered vehicle 10 further includes, for example, a vehicle speed detector 72. The vehicle speed detector 72 is, for example, connected to the electronic controller 82 in a manner allowing for wired communication or wireless communication. The vehicle speed detector 72 is, for example, configured to detect information related to the speed of the human-powered vehicle 10. The vehicle speed detector 72 is, for example, configured to detect information related to the rotational speed of the wheel 12. The vehicle speed detector 72 is, for example, configured to detect a magnet provided on at least one of the front wheel 12F and the rear wheel 12R.

The vehicle speed detector 72 is, for example, configured to output a predetermined number of detection signals during a period in which the wheel 12 completes one rotation. The predetermined number is, for example, one. The vehicle speed detector 72 outputs, for example, a signal corresponding to the rotational speed of the wheel 12. The electronic controller 82 can calculate the speed of the human-powered vehicle 10 based on the signal corresponding to the rotational speed of the wheel 12 and information related to the circumferential length of the wheel 12. The information related to the circumferential length of the wheel 12 is stored in, for example, storage 84.

The human-powered vehicle 10 further includes, for example, a crank rotational state detector 74. The crank rotational state detector 74 is, for example, connected to the electronic controller 82 in a manner allowing for wired communication or wireless communication. The crank rotational state detector 74 detects, for example, the rotational amount of at least one of the crank axle 20 and the at least one first rotational body 34.

The crank rotational state detector 74 is, for example, configured to detect information corresponding to at least one of the rotational speed of the crank axle 20 and the rotational speed of the at least one first rotational body 34. The information corresponding to the rotational speed of the crank axle 20 includes, for example, an angular acceleration of the crank axle 20. The information corresponding to the rotational speed of the at least one first rotational body 34 includes, for example, an angular acceleration of the at least one first rotational body 34.

The crank rotational state detector 74 is, for example, configured to output a signal corresponding to at least one of the rotational speed of the crank axle 20 and the rotational speed of the at least one first rotational body 34. The crank rotational state detector 74 is, for example, configured to output a detection signal corresponding to the rotational angle of at least one of the crank axle 20 and the at least one first rotational body 34 during a period in which at least one of the crank axle 20 and the at least one first rotational body 34 completes one rotation.

The crank rotational state detector 74 includes, for example, a magnetic sensor that outputs a signal corresponding to the strength of a magnetic field. The crank rotational state detector 74 includes, for example, a ring-shaped magnet having magnetic poles arranged in the circumferential direction. For example, the ring-shaped magnet is provided on the crank axle 20, the at least one first rotational body 34, or in the power transmission path from the crank axle 20 to the at least one first rotational body 34. The ring-shaped magnet includes, for example, one S-pole and one N-pole. Each of the S-pole and the N-pole continuously extends over 180 degrees about the rotational axis Cl of the crank axle 20. Instead of the magnetic sensor, the crank rotational state detector 74 can include an optical sensor, an acceleration sensor, a gyro sensor, a torque sensor, or the like.

The crank rotational state detector 74 is provided on, for example, the frame 16. In a case where the crank rotational state detector 74 is provided on the frame 16, the crank rotational state detector 74 can include a vehicle speed sensor. In a case where the crank rotational state detector 74 includes a vehicle speed sensor, the electronic controller 82 can be configured to calculate the rotational speed of the crank axle 20 based on the speed detected by the vehicle speed sensor and the transmission ratio. The crank rotational state detector 74 can be provided on the drive unit 48.

The crank rotational state detector 74 can be configured to detect the rotational amount of the at least one second rotational body 36. The crank rotational state detector 74 can be configured to detect information corresponding to the rotational speed of the at least one second rotational body 36. The information corresponding to the rotational speed of the at least one second rotational body 36 includes, for example, an angular acceleration of the at least one second rotational body 36. The crank rotational state detector 74 can be configured to output a signal corresponding to the rotational speed of the at least one second rotational body 36.

The human-powered vehicle 10 further includes, for example, a human driving force detector 76. The human driving force detector 76 is, for example, connected to the electronic controller 82 in a manner allowing for wired communication or wireless communication. The human driving force detector 76 is, for example, configured to output a signal corresponding to the torque applied to the crank axle 20 by a human driving force. The signal corresponding to the torque applied to the crank axle 20 by the human driving force includes information related to the human driving force input to the human-powered vehicle 10.

The human driving force detector 76 is provided on, for example, a member included in the transmission path of the human driving force or a member arranged near the member included in the transmission path of the human driving force. The member included in the transmission path of the human driving force includes, for example, the crank axle 20 or a member that transmits the human driving force between the crank axle 20 and the at least one first rotational body 34. The human driving force detector 76 is provided on, for example, a power transmission portion configured to transmit the human driving force from the crank axle 20 to the output unit 50. The power transmission portion is provided on, for example, the outer circumferential portion of the crank axle 20.

The human driving force detector 76 includes a strain sensor, a magnetostrictive sensor, a pressure sensor, or the like. A strain sensor includes a strain gauge. The human driving force detector 76 can have any configuration as long as information related to the human driving force is obtained.

The human driving force detector 76 can be provided on, for example, at least one of the crank arms 22A, 22B or at least one of the pedals 24A, 24B. In a case where the human driving force detector 76 is provided on at least one of the pedals 24A, 24B, the human driving force detector 76 can include a sensor that detects the force applied to the at least one of the pedals 24A, 24B. The human driving force detector 76 can be provided on the chain included in the linking body 38. In a case where the human driving force detector 76 is provided on the chain, the human driving force detector 76 can include a sensor that detects the tension on the chain.

The human-powered vehicle 10 further includes, for example, a motor load detector 78 configured to detect the load on the motor 42. The motor load detector 78 is, for example, connected to the electronic controller 82 in a manner allowing for wired communication or wireless communication. The motor load detector 78 is, for example, configured to detect the load on the motor 42. The motor load detector 78 includes, for example, a current sensor that detects the current flowing through the motor 42 and a rotation sensor that detects the rotational speed of the motor 42. The load on the motor 42 can be detected using a known technique based on the current flowing through the motor 42 and the rotational speed of the motor 42. Thus, the load on the motor 42 will not be described in detail. The motor load detector 78 can be included in the motor 42.

As mentioned above and as seen in FIG. 2, the control device 80 includes the electronic controller 82. The control device 80 can be provided on, for example, the vehicle body 14 or the drive unit 48. The electronic controller 82 is formed of one or more semiconductor chips that are mounted on a circuit board. Thus, the terms "electronic controller" and "controller" as used herein refers to hardware that executes a software program, and does not include a human being. The electronic controller 82 includes, for example, one or more processors 82A that execute predetermined control programs. Each of the processors 82A of the electronic controller 82 includes, for example, a central processing unit (CPU) or a micro-processing unit (MPU).

The processors 82A of the electronic controller 82 can be located at separate positions. Some of the processors 82A can be located on the human-powered vehicle 10, while other ones of the processors 82A can be located in a server connected to the internet. In a case where the processors 82A are located at separate positions, the processors 82A are connected to one another in a manner allowing for communication via a wireless communication device. The electronic controller 82 can include one or more microcomputers.

The control device 80 further includes, for example, the storage 84. The storage 84 is any computer storage device or any non-transitory computer-readable medium with the sole exception of a transitory, propagating signal. The storage 84 is, for example, connected to the electronic controller 82 in a manner allowing for wired communication or wireless communication. The storage 84 stores, for example, control programs and information used for control processes. The storage 84 includes, for example, a non-volatile memory and a volatile memory. The non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM).

The control device 80 can further include a drive circuit of the motor 42. For example, the electronic controller 82 and the drive circuit are provided in the housing 46. The electronic controller 82 and the drive circuit can be provided on the same circuit board. The drive circuit is, for example, connected to the electronic controller 82 in a manner allowing for wired communication or wireless communication. For example, the drive circuit drives the motor 42 in response to a control signal from the electronic controller 82.

The drive circuit is, for example, electrically connected to the motor 42. The drive circuit controls, for example, the supply of electric power from the battery 40 to the motor 42. The drive circuit includes, for example, an inverter circuit. The inverter circuit includes, for example, transistors. The inverter circuit has, for example, a configuration in which inverter units are connected to one another in parallel. Each inverter unit is formed by two transistors connected in series. The inverter circuit can include a current sensor that detects the current flowing through the inverter circuit. The current sensor is, for example, connected to the electronic controller 82 in a manner allowing for wired communication or wireless communication.

The electronic controller 82 is configured to control the motor 42. The electronic controller 82 is, for example, configured to control the motor 42 in accordance with the state of the human-powered vehicle 10. The electronic controller 82 is, for example, configured to control the motor 42 so that the output of the motor 42 changes in accordance with the human driving force input to the human-powered vehicle 10. The electronic controller 82 is, for example, configured to control the motor 42 so that the propulsion force changes in accordance with the human driving force input to the human-powered vehicle 10. The electronic controller 82 is, for example, configured to control the motor 42 in accordance with the human driving force detected by the human driving force detector 76.

The electronic controller 82 is, for example, configured to control the motor 42 in accordance with at least one of the rotational speed of the crank axle 20 and the rotational speed of the at least one first rotational body 34 detected by the crank rotational state detector 74. The electronic controller 82 is, for example, configured to control the motor 42 in accordance with the speed of the human-powered vehicle 10 detected by the vehicle speed detector 72.

In a case where the speed of the human-powered vehicle 10 is less than or equal to a first vehicle speed, the electronic controller 82 can be configured to drive the motor 42 to apply a propulsion force to the human-powered vehicle 10 in accordance with at least one of the human driving force and the rotational speed of the crank axle 20. The first vehicle speed is, for example, set by regulations of each country. The first vehicle speed is, for example, 24 km/h, 25 km/h, 30 km/h, 32 km/h, or 45 km/h.

The electronic controller 82 is, for example, configured to control the motor 42 so that an assist level of the motor 42 is a predetermined assist level. The assist level includes, for example, at least one of a ratio of the output of the motor 42 to the human driving force input to the human-powered vehicle 10, the maximum value of the output of the motor 42, and a restriction level that restricts changes in the output of the motor 42 in a case where the output of the motor 42 decreases.

The electronic controller 82 is, for example, configured to control the motor 42 so that a ratio of the assist force to the human driving force is a predetermined ratio. The human driving force corresponds to, for example, the propulsion force of the human-powered vehicle 10 produced by a user rotating the crank axle 20. The human driving force corresponds to, for example, the driving force input to the at least one first rotational body 34 by the user rotating the crank axle 20. The electronic controller 82 is, for example, configured to select an assist mode and an assist stop mode.

The assist force includes, for example, the driving force input to the at least one first rotational body 34 in accordance with the output of the motor 42. The assist force corresponds to, for example, the propulsion force of the human-powered vehicle 10 produced by the rotation of the motor 42. In a case where the drive unit 48 includes the speed reducer 52, the assist force corresponds to, for example, the output of the speed reducer 52.

The predetermined ratio does not have to be constant and can be varied in accordance with at least one of the human driving force, the rotational speed of the crank axle 20, the rotational speed of the at least one first rotational body 34, and the vehicle speed. The predetermined ratio does not have to be constant and can be varied in accordance with the vehicle speed and at least one of the human driving force, the rotational speed of the crank axle 20, and the rotational speed of the at least one first rotational body 34.

The human driving force corresponds to, for example, the propulsion force of the human-powered vehicle 10 produced by the user rotating the crank axle 20. The human driving force corresponds to, for example, the driving force input to the at least one first rotational body 34 by the user rotating the crank axle 20. The human driving force is, for example, represented by at least one of torque and power. In a case where the human driving force is represented by torque, the human driving force is referred to as, for example, the human torque. The power of the human driving force is, for example, the product of the torque applied to the crank axle 20 and the rotational speed of the crank axle 20.

The assist force is, for example, represented by at least one of torque and power. In a case where the assist force is represented by torque, the assist force is referred to as, for example, the assist torque. In a case where the assist force is represented by power, the assist force is referred to as, for example, the assist power. The assist power is, for example, the product of the output torque of the speed reducer 52 and the rotational speed of an output shaft of the speed reducer 52. The ratio of the assist force to the human driving force can be a ratio of the assist torque to the human torque or a ratio of the assist power to the human force based power.

The electronic controller 82 is, for example, configured to control the motor 42 so that the assist force is less than or equal to the maximum assist force. The electronic controller 82 is, for example, configured to control the motor 42 so that the assist torque is less than or equal to the maximum assist torque. The maximum assist torque is, for example, a value in a range between 20 Nm and 200 Nm, inclusive. The maximum assist torque is determined by, for example, at least one of an output characteristic and a control mode of the motor 42. The electronic controller 82 can be configured to control the motor 42 so that the assist power is less than or equal to the maximum assist power.

The electronic controller 82 is, for example, configured to control the motor 42 so that the response speed of the assist torque relative to the human driving force is a predetermined value. The electronic controller 82 is, for example, configured to control the motor 42 so that the response speed of the assist torque in a case where the human driving force decreases is less than the response speed of the assist torque in a case where the human driving force increases. In a case where the human driving force decreases, for example, the electronic controller 82 decreases the response speed through a filtering process. The filter includes, for example, a time constant.

The electronic controller 82 is, for example, configured to control the derailleur 58A in a case where a shifting condition is satisfied. The shifting condition is related to, for example, at least one of a traveling state of the human-powered vehicle 10, a traveling environment of the human-powered vehicle 10, and an operation state of the operating unit 64. The traveling environment of the human-powered vehicle 10 includes, for example, at least one of gradient and traveling resistance of a road surface. The traveling state of the human-powered vehicle 10 includes, for example, at least one of the vehicle speed, the rotational speed of the crank axle 20, the human driving force, and the inclination angle of the human-powered vehicle 10.

The shifting condition is, for example, related to automatic shifting and satisfied in at least one of a case where the traveling state of the human-powered vehicle 10 satisfies a predetermined state and a case where the traveling environment of the human-powered vehicle 10 satisfies a predetermined state. The traveling environment of the human-powered vehicle 10 includes, for example, at least one of gradient and traveling resistance of a road surface. The traveling state of the human-powered vehicle 10 includes, for example, at least one of the vehicle speed, the rotational speed of the crank axle 20, the human driving force, and the inclination angle of the human-powered vehicle 10. The shifting condition can be satisfied in a case where the electronic controller 82 receives a shifting instruction from the operating unit 64. The shifting instruction includes, for example, at least one of a shifting instruction related to an up-shift operation and a shifting instruction related to a down-shift operation.

In a case where the shifting condition is satisfied and a first condition related to pedaling is satisfied, for example, the electronic controller 82 is configured to execute a predetermined shifting operation that controls the motor 42 to drive the linking body 38 and controls the derailleur 58A to operate the linking body 38 so as to shift the transmission ratio. The first condition is satisfied, for example, in at least one of a case where the human driving force is less than or equal to a first driving force, a case where the rotational speed of the crank axle 20 is less than or equal to a first rotational speed, and a case where the crank axle 20 is oscillating. A case where the crank axle 20 is oscillating includes a case where the crank axle 20 is not fully stopped and the rotational angle of the crank axle 20 is within a predetermined angle range. The predetermined angle range is, for example, one degree or greater and twenty degrees or less. In a predetermined shifting operation, for example, the electronic controller 82 is configured to drive the motor 42 without applying a propulsion force to the human-powered vehicle 10.

In a case where the electronic controller 82 changes the shift stage more than once in a predetermined shifting operation, for example, the electronic controller 82 controls the transmission 44 to operate the derailleur 58A and shift the transmission ratio by one stage. Then, after a third time period elapses, the electronic controller 82 controls the transmission 44 to operate the derailleur 58A and shift the transmission ratio by one step again. For example, the electronic controller 82 can continuously drive the motor 42 during the predetermined shifting operation. Alternatively, the electronic controller 82 can intermittently drive the motor 42 in accordance with the operation of the derailleur 58A during the predetermined shifting operation. The third time period is, for example, greater than zero seconds and less than or equal to two seconds. The third time period is, for example, one second.

The electronic controller 82 can, for example, set the third time period for each shift stage. For example, the electronic controller 82 can increase the third time period as the transmission ratio becomes greater. For example, the electronic controller 82 can decrease the third time period as the transmission ratio becomes smaller. The electronic controller 82 can vary the third time period in accordance with the vehicle speed of the human-powered vehicle 10. For example, the electronic controller 82 can vary the third time period so that the third time period becomes shorter as the vehicle speed of the human-powered vehicle 10 increases. For example, the third time period in an up-shift operation can differ from the third time period in a down-shift operation. For example, the third time period in an up-shift operation can be shorter than the third time period in a down-shift operation. For example, the third time period in an up-shift operation can be longer than the third time period in a down-shift operation.

In a case where the transmission 44 consecutively changes the shift stage as the rider pedals the human-powered vehicle 10, for example, the electronic controller 82 controls the motor 42 and the transmission 44 so that the shift stage is changed to a first one of the shift stages and then, after the third time period elapses, to a second one of the shift stages regardless of whether the motor 42 applies a propulsion force to the human-powered vehicle 10.

In a case where the transmission 44 consecutively changes the shift stage as the rider pedals the human-powered vehicle 10, the electronic controller 82 can control the transmission 44 so that the shift stage is changed to a first one of the shift stages and then the transmission 44 is stopped for the third time period in accordance with whether the motor 42 applies a propulsion force to the human-powered vehicle 10. For example, the electronic controller 82 can control the transmission 44 so that the third time period in a case where the transmission 44 consecutively changes the shift stage as the rider pedals the human-powered vehicle 10 and the motor 42 applies a propulsion force to the human-powered vehicle 10 is longer than the third time period in a case where the transmission 44 consecutively changes the shift stage as the rider pedals the human-powered vehicle 10 and the motor 42 does not apply a propulsion force to the human-powered vehicle 10. A case where the motor 42 does not apply a propulsion force to the human-powered vehicle 10 includes, for example, a case where the control mode of the electronic controller 82 is the assist stop mode or a case where the vehicle speed is greater than the first vehicle speed.

The electronic controller 82 can be configured to switch an automatic shifting setting between a shifting permitted state and a shifting prohibited state. The automatic shifting setting determines whether to permit execution of automatic shifting in a case where the shifting condition related to automatic shifting is satisfied. In a case where the automatic shifting setting is switched to the shifting permitted state, the electronic controller 82 can be configured to set a first permission setting and a second permission setting. The first permission setting determines whether to permit or prohibit shifting in a case where the first condition related to pedaling is not satisfied and the shifting condition related to automatic shifting is satisfied. The second permission setting determines whether to permit or prohibit shifting in a case where the first condition related to pedaling is satisfied and the shifting condition related to the automatic shifting is satisfied. In a case where shifting is permitted in the second permission setting, the predetermined shifting operation can be executed. The user can switch between the automatic shifting setting, the first permission setting, and the second permission setting by using, for example, an external device configured to establish communication with the operating unit 64 and the control device 80. In a case where the automatic shifting setting is switched to the shifting permitted state, for example, the electronic controller 82 can be configured not to prohibit both the first permission setting and the second permission setting.

The electronic controller 82 decreases an upper limit value N of the output of the motor 42 in an up-shift operation that increases the transmission ratio by shifting from one of the shift stages to another one of the shift stages. The electronic controller 82 decreases the upper limit value N in a down-shift operation that decreases the transmission ratio by shifting from one of the shift stages to another one of the shift stages. In a case where the motor 42 applies a propulsion force to the human-powered vehicle 10, for example, the electronic controller 82 decreases the upper limit value N of the output of the motor 42 in an up-shift operation. In a case where the motor 42 applies a propulsion force to the human-powered vehicle 10, for example, the electronic controller 82 decreases the upper limit value N in a down-shift operation.

In a case where the motor 42 applies a propulsion force to the human-powered vehicle 10 and the electronic controller 82 shifts the transmission ratio by shifting from one of the shift stages to another one of the shift stages, for example, the electronic controller 82 decreases the upper limit value N of the output of the motor 42 so that the motor 42 does not output torque greater than the upper limit value N.

The electronic controller 82 is configured to control the motor 42 so that the upper limit value N in an up-shift operation performed between two predetermined ones of the shift stages that differ in the transmission ratio by one stage differs from the upper limit value N in a down-shift operation performed between the two predetermined ones of the shift stages. The two predetermined ones of the shift stages that differ in the transmission ratio by one stage can include every one of or some of combinations of two shift stages that differ in the transmission ratio by one stage. The electronic controller 82 is configured to control the motor 42 so that the upper limit value N in an up-shift operation performed between two predetermined ones of the shift stages is less than the upper limit value N in a down-shift operation performed between the two predetermined ones of the shift stages.

Table 1 shows an example of the relationship between the shift stages, the upper limit value N in a down-shift operation, and the upper limit value N in an up-shift operation. In Table 1, the number of shift stages is eleven. In Table 1, in a case where the shift stage is downshifted from the eleventh stage to the tenth stage, from the tenth stage to the ninth stage, from the ninth stage to the eighth stage, or from the eighth stage to the seventh stage, the electronic controller 82 sets the upper limit value N to the upper limit value N1. In a case where the shift stage is downshifted from the seventh stage to the sixth stage, from the sixth stage to the fifth stage, from the fifth stage to the fourth stage, from the fourth stage to the third stage, from the third stage to the second stage, or from the second stage to the first stage, the electronic controller 82 sets the upper limit value N to the upper limit value N2. The upper limit value N2 is, for example, substantially equal to the normal upper limit value NA. The normal upper limit value NA is, for example, the upper limit value N at which the motor 42 can apply a suitable propulsion force to the human-powered vehicle 10. The upper limit value N1 is, for example, less than the upper limit value N2. The normal upper limit value NA can be varied in accordance with, for example, the assist mode.

In a case where the shift stage is upshifted from the tenth stage to the eleventh stage, from the ninth stage to the tenth stage, or from the eighth stage to the ninth stage, the electronic controller 82 sets the upper limit value N to the upper limit value N3. In a case where the shift stage is upshifted from the seventh stage to the eighth stage, from the sixth stage to the seventh stage, from the fifth stage to the sixth stage, or from the fourth stage to the fifth stage, the electronic controller 82 sets the upper limit value N to the upper limit value N4. In a case where the shift stage is upshifted from the third stage to the fourth stage, from the second stage to the third stage, or from the first stage to the second stage, the electronic controller 82 sets the upper limit value N to the upper limit value N2. The upper limit value N3 is, for example, less than or equal to the upper limit value N4. The upper limit value N4 is, for example, less than the upper limit value N2. As long as the upper limit values N1, N3, and N4 are less than the upper limit value N2, the upper limit values N1, N3, and N4 can be the same or differ from one another. The upper limit value NA is, for example, a value that corresponds to an assist force in a range between 70 Nm and 120 Nm, inclusive. The upper limit values N1, N3, and N4 are, for example, values that correspond to an assist force in a range from 30 Nm or greater to less than 70 Nm.

In Table 1, in a case where the two predetermined ones of the shift stages include, for example, the fourth and fifth stages, the electronic controller 82 sets the upper limit value N in an up-shift operation to be less than the upper limit value N in a down-shift operation. In a case where the two predetermined ones of the shift stages include, for example, the fifth and sixth stages, the electronic controller 82 sets the upper limit value N in an up-shift operation to be less than the upper limit value N in a down-shift operation. In a case where the two predetermined ones of the shift stages include, for example, the sixth and seventh stages, the electronic controller 82 sets the upper limit value N in an up-shift operation to be less than the upper limit value N in a down-shift operation.

TABLE 1

| Shift Stage | 11 | 10 | 9 | 8 | 7 | 6 | 5 | 4 | 3 | 2 | 1 |
|---|---|---|---|---|---|---|---|---|---|---|---|
| Upper Limit Value N in Down-Shift Operation | | | N1 | | | | | N2 | | | |
| Upper Limit Value N in Up-Shift Operation | | | N3 | | | N4 | | | N2 | | |

The electronic controller 82 can decrease the upper limit value N of the output of the motor 42 in a case where the transmission ratio is increased in a first group of at least two of the shift stages by changing one of the shift stages in the first group to another one of the shift stages in the first group. For example, the electronic controller 82 does not decrease the upper limit value N in a case where the transmission ratio is increased by changing a shift stage outside the first group. A case where the transmission ratio is increased by changing one of the shift stages to another one of the shift stages includes, for example, a case where an up-shift operation is performed.

The electronic controller 82 can decrease the upper limit value N of the output of the motor 42 in a case where the transmission ratio is decreased in a second group of at least two of the shift stages by changing one of the shift stages in the second group to another one of the shift stages in the second group. For example, the electronic controller 82 does not decrease the upper limit value N in a case where the transmission ratio is decreased by changing a shift stage outside the second group. A case where the transmission ratio is decreased by changing one of the shift stages to another one of the shift stages includes, for example, a case where a down-shift operation is performed.

At least one of the at least two shift stages in the first group differs from, for example, at least one of the at least two shift stages in the second group. For example, the first group includes more shift stages than the second group. The first group can include less shift stages than the second group. The first group and the second group can include the same number of shift stages, and at least one of the shift stages in the first group does not have to be in the second group.

In Table 1, for example, the first group includes the fourth to eleventh stages. In Table 1, for example, the second group includes the seventh to eleventh stages.

The electronic controller 82 is configured to vary the upper limit value N by controlling the motor 42 so as to decrease the upper limit value N as the human driving force applied to the human-powered vehicle 10 increases. The electronic controller 82 is, for example, configured to vary the upper limit value N by controlling the motor 42 so as to decrease the upper limit value N as the human torque increases. The electronic controller 82 is, for example, configured to vary the upper limit value N by controlling the motor 42 so as to decrease the upper limit values N1, N3, and N4 as the human driving force applied to the human-powered vehicle 10 increases.

The electronic controller 82 can be configured to vary the upper limit value N and decrease the output of the motor 42 by controlling the motor 42 so as to gradually decrease the output of the motor 42 over a first period. The electronic controller 82 can vary the upper limit value N and decrease the output of the motor 42 by decreasing the output of the motor 42 to the upper limit value N in a stepped manner at intervals of a fourth time period. The electronic controller 82 can vary the upper limit value N and decrease the output of the motor 42 by continuously decreasing the output of the motor 42 to the upper limit value N. The first period is, for example, a first time period. The first time period is, for example, 0.05 seconds or greater and 0.3 seconds or less.

The electronic controller 82 is, for example, configured to control the motor 42 so that in a case where the upper limit value N is decreased to decrease the output of the motor 42, if a predetermined period elapses after decreasing the output of the motor 42, the upper limit value N is increased. The electronic controller 82 can be configured to control the motor 42 so that in a case where the upper limit value N is decreased to decrease the output of the motor 42, if the shifting of the shift stage is completed, the upper limit value N is increased.

The electronic controller 82 can be configured to control the motor 42 so that in a case where the upper limit value N is decreased to decrease the output of the motor 42, if the predetermined period elapses after decreasing the output of the motor 42, the upper limit value N is increased to the upper limit value N that was set until immediately before the upper limit value N was decreased. The predetermined period includes, for example, a period during which the rotational amount of the wheel 12 of the human-powered vehicle 10 reaches a predetermined rotational amount. The predetermined rotational amount is, for example, 30 degrees or greater and less than 460 degrees. The predetermined rotational amount can be set in accordance with a period from when the transmission 44 starts shifting the shift stage to when the transmission 44 completes the shifting of the shift stage.

The predetermined period can be determined in accordance with a length of where the linking body 38 engages the adjacent one of the rotational bodies 60 and a distance T from one of the at least two shifting facilitation regions 62 to an adjacent one of the at least two shifting facilitation regions 62. The predetermined period can be determined in accordance with the length of where the linking body 38 engages the adjacent one of the rotational bodies 60, the distance T from one of the at least two shifting facilitation regions 62 to the adjacent one of the at least two shifting facilitation regions 62, and at least one of the vehicle speed and the rotational speed of the crank axle 20. For example, the storage 84 stores a table related to the distance T in each shift stage and the length of where the linking body 38 engages the rotational body 60 in each shift stage. The predetermined period can be set to become shorter as at least one of the vehicle speed and the rotational speed of the crank axle 20 increases.

The length of where the linking body 38 engages the rotational body 60 in each shift stage includes the length of where the chain engages the sprocket corresponding to the shift stage used during normal traveling. In the first shifting facilitation region 62A and the second shifting facilitation region 62B that are adjacent to each other, the distance T includes, for example, the distance between the ends of the first shifting facilitation region 62A and the second shifting facilitation region 62B that are farthest from each other in the circumferential direction of the sprocket. In the first shifting facilitation region 62A and the second shifting facilitation region 62B that are adjacent to each other, the distance T includes, for example, the distance between a first sprocket tooth T1 in the first shifting facilitation region 62A that is farthest from the second shifting facilitation region 62B and a second sprocket tooth T2 in the second shifting facilitation region 62B that is farthest from the first shifting facilitation region 62A in the circumferential direction of the sprocket.

The electronic controller 82 is, for example, configured to increase the upper limit value N and increase the output of the motor 42 by gradually increasing the output of the motor 42 over a second period. The electronic controller 82 can increase the upper limit value N and increase the output of the motor 42 by increasing the output of the motor 42 to the upper limit value N that was set until immediately before decreasing the upper limit value N in a stepped manner at intervals of a fifth time period. The electronic controller 82 can increase the upper limit value N and increase the output of the motor 42 by continuously increasing the output of the motor 42 to the upper limit value N that was set until immediately before decreasing the upper limit value N. The second period is, for example, a second time period. The second time period is, for example, 0.05 seconds or greater and 0.2 seconds or less. The second period is, for example, shorter than the first period.

The electronic controller 82 can be configured to control the transmission 44 so that the transmission 44 starts an action in accordance with a peak time of the human driving force applied to the human-powered vehicle 10. The electronic controller 82 can be configured to control the transmission 44 so as to start an action of the transmission 44 in accordance with the peak time and the distance T from one of the at least two shifting facilitation regions 62 to an adjacent one of the at least two shifting facilitation regions 62. Further, the electronic controller 82 can be configured to control the motor 42 so as to decrease the upper limit value N in accordance with the peak time and the distance T. The electronic controller 82 is configured to control the motor 42 and the transmission 44 in accordance with, for example, the peak time, the distance T, and the length of where the linking body 38 engages the rotational body 60. In a case where there is only one shifting facilitation region 62, the distance T corresponds to, for example, 360 degrees.

The human driving force is minimal, for example, in a case where one of the crank arms 22A and 22B is located at a position corresponding to the top dead center and the other of the crank arms 22A and 22B is located at a position corresponding to the bottom dead center. The human driving force is maximal, for example, in a case where the crank arms 22A and 22B are located at positions corresponding to the peak points between the top dead center and the bottom dead center. The peak time of the human driving force is, for example, a time at which the human driving force becomes maximal in a case where one of the crank arms 22A and 22B is rotated from the position corresponding to the top dead center to the position corresponding to the bottom dead center. The peak time can be a time at which the human driving force is maximal in a case where one of the crank arms 22A and 22B is rotated from the position corresponding to the bottom dead center to the position corresponding to the top dead center.

The electronic controller 82 is, for example, configured to control the transmission 44 so that the transmission 44 starts an action in a case where the human driving force becomes less than or equal to a driving force corresponding to a predetermined ratio of the human driving force at the peak time. The predetermined ratio is in a range between 10% and 90%, inclusive. Preferably, the predetermined ratio is in a range between 60% and 80%, inclusive.

The electronic controller 82 calculates a completion period required for changing of the shift stage from an adjacent one of the shift stages to be completed based on, for example, information stored in the storage 84. The information stored in the storage 84 includes, for example, a table of the shift stages and the completion period corresponding to each one of the shift stages. The completion period is set in accordance with, for example, the distance T in each shift stage and an amount of the chain wound around the sprocket in the changed shift stage. In a case where there is no shifting facilitation region 62, the completion period is set in accordance with a predetermined rotational angle and, for example, the amount of the chain wound around the sprocket in the changed shift stage. The predetermined rotational angle can be constant or varied in accordance with the size of the sprocket. The wound amount of the chain includes the length of where the linking body 38 engages the sprocket. The electronic controller 82 determines that changing of the shift stage is completed, for example, in a case where the sprocket is rotated to a rotational angle that is in accordance with the distance T and the wound amount of the chain.

The transmission 44 can further include a transmission state detector that detects information related to a change in the shift stage. The electronic controller 82 can determine whether shifting of the shift stage is completed with the transmission state detector. The transmission state detector includes, for example, a sensor that outputs a signal in accordance with actuation of the electric actuator. The electronic controller 82 determines whether shifting of the shift stage is completed in accordance with, for example, an output of the sensor that outputs a signal in accordance with actuation of the electric actuator. The electronic controller 82 can determine whether shifting of the transmission ratio is completed in accordance with the rotational speed of the crank axle 20 and the rotational speed of the wheel 12.

Figure 5:
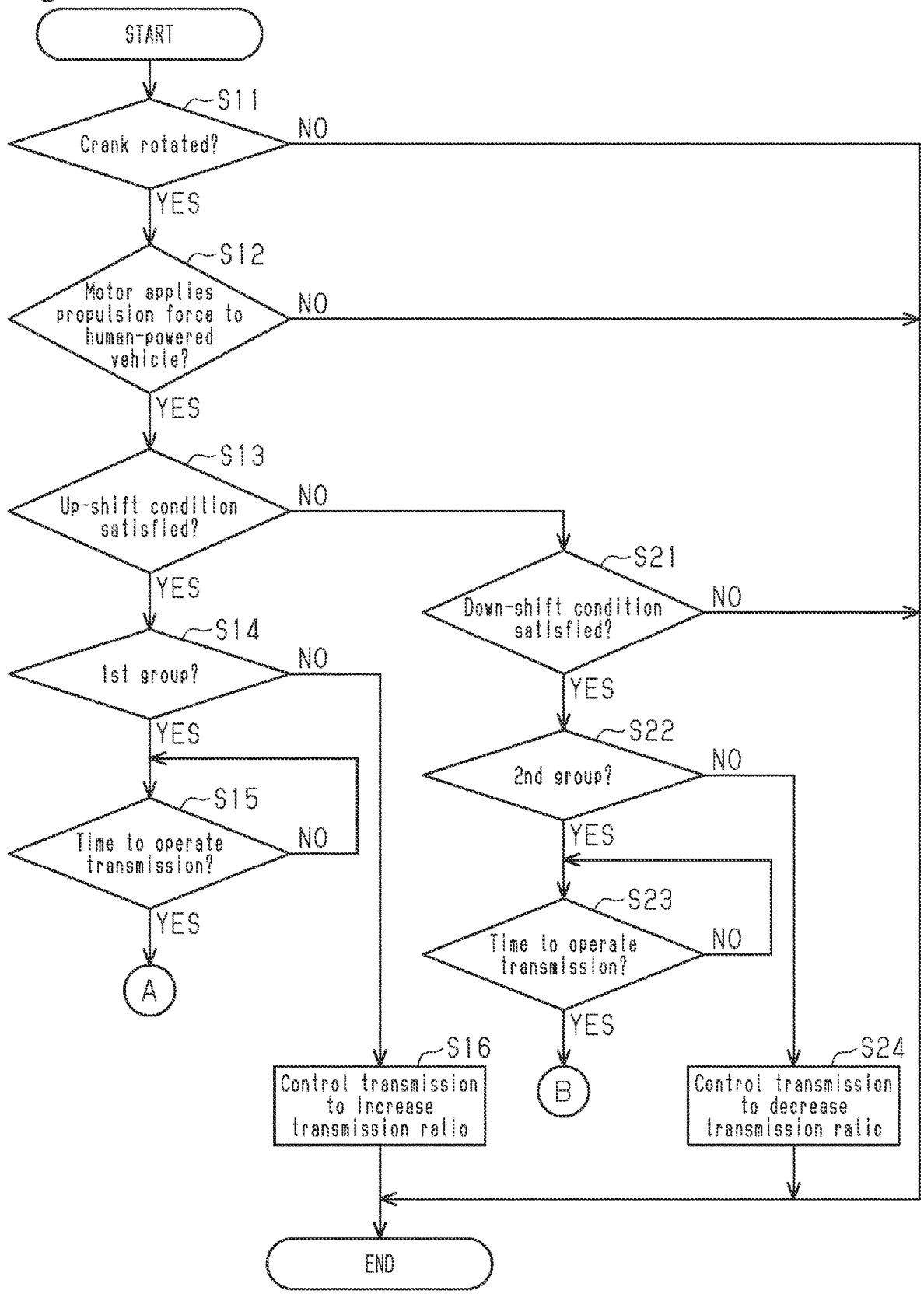
FIG. 5 is a flowchart illustrating a first part of a control process performed by an electronic controller of FIG. 2 to control a motor and a transmission.
Figure 6:
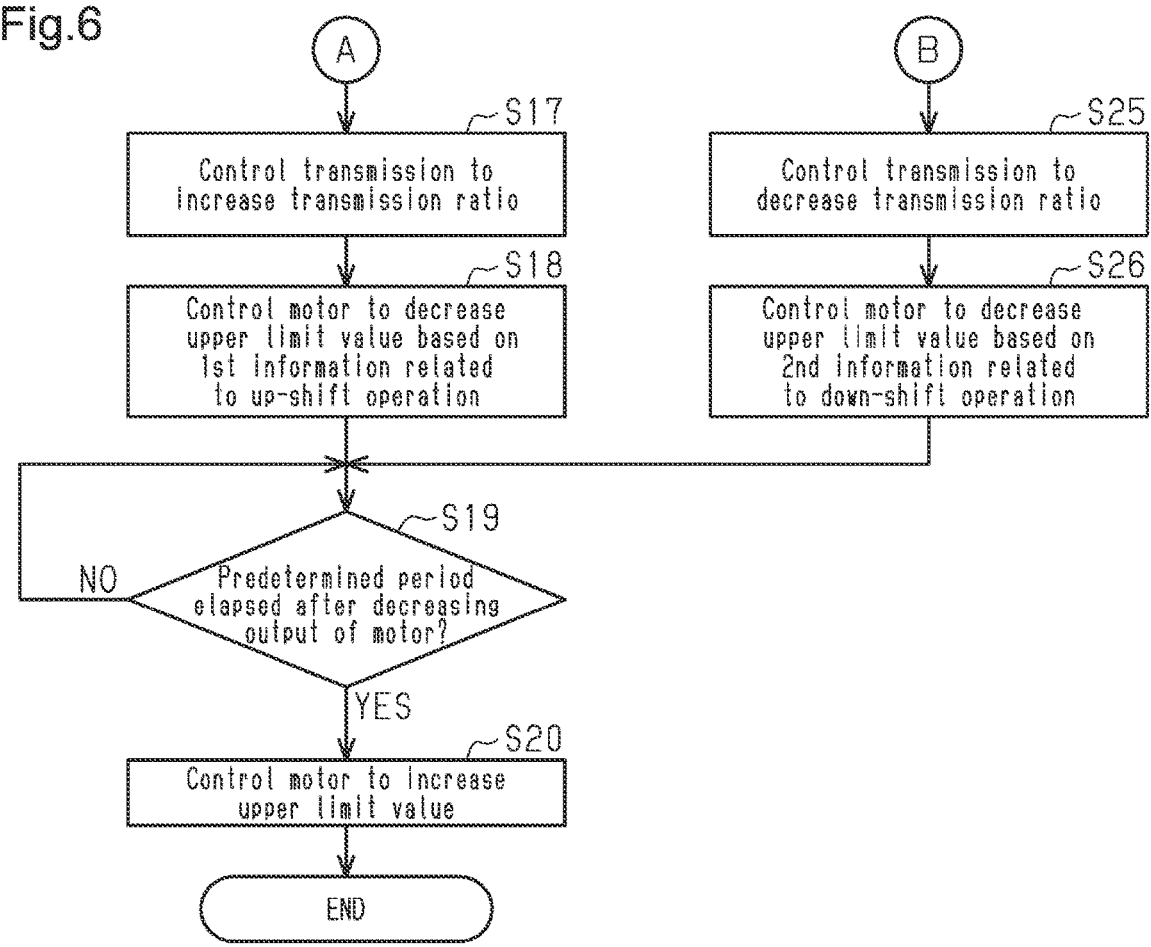
FIG. 6 is a flowchart illustrating a second part of the control process performed by the electronic controller of FIG. 2 to control the motor and the transmission.

A control process executed by the electronic controller 82 to control the motor 42 will now be described with reference to FIGS. 5 and 6. For example, in a case where electric power is supplied to the electronic controller 82, the electronic controller 82 starts the process of the flowchart shown in FIG. 5 from step S11. In a case where the processes of the flowcharts shown in FIGS. 5 and 6 end, the electronic controller 82 repeats the processes from step S11 in predetermined cycles, for example, until the supply of electric power stops.

In step S11, the electronic controller 82 determines whether the crank axle 20 is rotated. In a case where the crank axle 20 is rotated, the electronic controller 82 proceeds to step S12. In a case where the crank axle 20 is not rotated, the electronic controller 82 ends processing. In step S12, the electronic controller 82 determines whether the motor 42 applies a propulsion force to the human-powered vehicle 10. In a case where the motor 42 applies a propulsion force to the human-powered vehicle 10, the electronic controller 82 proceeds to step S13. In a case where the motor 42 does not apply a propulsion force to the human-powered vehicle 10, the electronic controller 82 ends processing.

In step S13, the electronic controller 82 determines whether an up-shift condition is satisfied. For example, the up-shift condition is satisfied in at least one of a case where the vehicle speed is greater than or equal to the first vehicle speed, a case where the rotational speed of the crank axle 20 is greater than or equal to a first rotational speed, and a case where the human driving force is greater than or equal to a first human driving force. The up-shift condition can be satisfied in a case where the electronic controller 82 receives a shifting instruction related to an up-shift operation from the operating unit 64. In a case where the up-shift condition is satisfied, the electronic controller 82 proceeds to step S14.

In step S14, the electronic controller 82 determines whether the present shift stage is included in the first group. The first group includes at least two shift stages. Instead of determining whether the present shift stage is included in the first group, the electronic controller 82 can determine whether the present shift stage is a predetermined shift stage in step S14. In a case where the present shift stage is included in the first group, the electronic controller 82 proceeds to step S15. In a case where the present shift stage is not included in the first group, the electronic controller 82 proceeds to step S16. In step S16, the electronic controller 82 controls the transmission 44 to increase the transmission ratio and then ends processing.

In step S15, the electronic controller 82 determines whether it is time to operate the transmission 44. The time to operate the transmission 44 is determined in accordance with, for example, the peak time, the distance T, and the length of where the linking body 38 engages the rotational body 60 in the changed shift stage. In a case where it is not time to operate the transmission 44, the electronic controller 82 repeats step S15 until it becomes time to operate the transmission 44. In a case where it becomes time to operate the transmission 44, the electronic controller 82 proceeds to step S17.

In step S17, the electronic controller 82 controls the transmission 44 to increase the transmission ratio and then proceeds to step S18. In step S18, the electronic controller 82 controls the motor 42 to decrease the upper limit value N based on first information related to an up-shift operation and then proceeds to step S19. The first information related to an up-shift operation includes, for example, a table such as Table 1. The storage 84 stores the first information related to an up-shift operation. The electronic controller 82 controls the motor 42 so that the upper limit value N is gradually decreased in step S18. The electronic controller 82 can execute step S18 before step S17 or together with step S17.

In step S19, the electronic controller 82 determines whether the predetermined period elapsed after decreasing the output of the motor 42. In a case where the predetermined period elapsed after decreasing the output of the motor 42, the electronic controller 82 proceeds to step S20. In a case where the predetermined period has not elapsed after decreasing the output of the motor 42, the electronic controller 82 repeats step S19 until the predetermined period elapses. In step S20, the electronic controller 82 controls the motor 42 to increase the upper limit value N and then ends processing. In step S20, the electronic controller 82 controls the motor 42 so that the upper limit value N is gradually increased. In step S20, the electronic controller 82 controls the motor 42 so that the upper limit value N is gradually increased to the upper limit value N that was set immediately before the upper limit value N was decreased.

In a case where the up-shift condition is not satisfied in step S13, the electronic controller 82 proceeds to step S21. In step S21, the electronic controller 82 determines whether a down-shift condition is satisfied. For example, the down-shift condition is satisfied in at least one of a case where the vehicle speed is less than or equal to a second vehicle speed that is less than the first vehicle speed, a case where the rotational speed of the crank axle 20 is less than or equal to a second rotational speed that is less than the first rotational speed, and a case where the human driving force is less than or equal to a second human driving force that is less than the first human driving force. The down-shift condition can be satisfied in a case where the electronic controller 82 receives a shifting instruction related to a down-shift operation from the operating unit 64. In a case where the down-shift condition is satisfied, the electronic controller 82 proceeds to step S22. In a case where the down-shift condition is not satisfied, the electronic controller 82 ends processing.

In step S22, the electronic controller 82 determines whether the changed shift stage is included in the second group. The second group includes at least two shift stages. Instead of determining whether the changed shift stage is included in the second group, the electronic controller 82 can determine whether the changed shift stage is a predetermined shift stage in step S22. In a case where the changed shift stage is included in the second group, the electronic controller 82 proceeds to step S23. In a case where the changed shift stage is not included in the second group, the electronic controller 82 proceeds to step S24. In step S24, the electronic controller 82 controls the transmission 44 to decrease the transmission ratio and then ends processing.

In step S23, the electronic controller 82 determines whether it is time to operate the transmission 44. In a case where it is not time to operate the transmission 44, the electronic controller 82 repeats step S23 until it becomes time to operate the transmission 44. In a case where it becomes time to operate the transmission 44, the electronic controller 82 proceeds to step S25.

In step S25, the electronic controller 82 controls the transmission 44 to decrease the transmission ratio and then proceeds to step S26. In step S26, the electronic controller 82 controls the motor 42 to decrease the upper limit value N based on second information related to a down-shift operation and then proceeds to step S19. The second information related to a down-shift operation includes, for example, a table such as Table 1. The storage 84 stores the second information related to a down-shift operation. The electronic controller 82 controls the motor 42 so that the upper limit value N is gradually decreased in step S26. The electronic controller 82 can execute step S26 before step S25 or together with step S25.

Steps S11 and S12 can be executed in any order. At least one of steps S11 and S12 can be omitted. Step S19 can be omitted. In a case where step S19 is omitted, the electronic controller 82 proceeds to step S20 after steps S18 and S26. Steps S19 and S20 can be omitted. In a case where steps S19 and S20 are omitted, the electronic controller 82 ends processing after steps S18 and S26.

Figure 7:
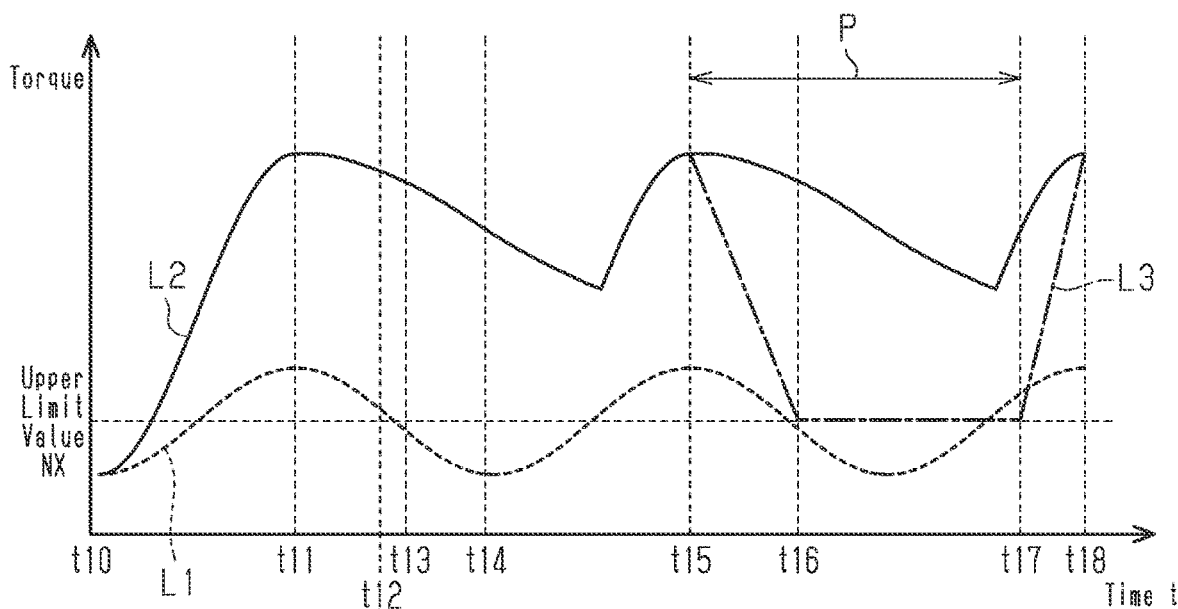
FIG. 7 is a timing diagram showing an example of changes in a human driving force and an upper limit value in accordance with the first embodiment.

In FIG. 7, the broken line L1 indicates the human driving force while the rider is pedaling the human-powered vehicle 10 at a constant pitch. The solid line L2 indicates the torque of the motor 42 in a case where the transmission ratio is shifted and the upper limit value N is not decreased. The single-dashed line L3 indicates the torque of the motor 42 in the case where the transmission ratio is shifted and the upper limit value N is decreased to an upper limit value NX. In FIG. 7, the human driving force is represented by torque. The upper limit value NX corresponds to, for example, one of the upper limit values N1, N3, and N4 in Table 1.

Time t11 indicates the peak time of the human driving force. In the period from time t10 to time t11, the human driving force increases. In the period from time t10 to time t11, the torque of the motor 42 is increased as the human driving force increases. After time t11, the human driving force falls and rises repeatedly. In the period during which the human driving force decreases after time t11, the electronic controller 82 decreases the response speed of the motor 42 relative to the human driving force. Thus, the torque of the motor 42 is gradually decreased as the human driving force decreases.

Time t12 indicates a time at which the crank axle 20 is rotated from the peak time and the human driving force detected by the human driving force detector 76 becomes 70% or greater and 80% or less of the human driving force at the peak time.

Time t13 indicates a time at which the shifting condition is satisfied.

Time t14 indicates a time at which the derailleur 58A starts an action to change the shift stage.

Time t15 indicates a time at which the electronic controller 82 starts to control the motor 42 to decrease the upper limit value N. Time t15 is determined in accordance with the length of where the linking body 38 engages the sprocket in the changed shift stage. Time t15 is determined so that the period from time t12 to time t15 corresponds to, for example, a value obtained by subtracting the length of where the linking body 38 engages three teeth of the sprocket in the changed shift stage from the length of where the linking body 38 engages the sprocket in the changed shift stage. The electronic controller 82 can start controlling the motor 42 to decrease the upper limit value N at time t14 without waiting until time t15. The electronic controller 82 can start controlling the motor 42 to decrease the upper limit value N between time t14 and time t15.

Time t16 indicates a time at which the first period elapsed from time t15. In the single-dashed line L3, the torque of the motor 42 is decreased to the upper limit value NX at time t16.

Time t17 indicates a time at which the electronic controller 82 starts to control the motor 42 to increase the upper limit value N. After time t17, the torque of the motor 42 increases as the upper limit value N is increased.

Time t18 indicates a time at which the second period elapsed from time t17. At time t18, the upper limit value N becomes equal to the upper limit value N that was set immediately before the upper limit value N was decreased. In the single-dashed line L3, at time t18, the torque of the motor 42 is increased to the torque that is in accordance with the human driving force and the assist level.

The period P from time t15 to time t17 is a period from when the upper limit value N starts to decrease to when the upper limit value N starts to increase. The electronic controller 82 determines time t15 and time t17 so that the period P becomes sufficient to reduce shift shock caused by the changing of the shift stage. The period from time t13 to time t17 is substantially equal to, for example, the longest period required to complete changing of the shift stage that is set in each shift stage. The period from time t13 to time t17 corresponds to the sum of the distance T and the amount of the chain wound around the sprocket in the changed shift stage. The electronic controller 82 can convert information related to a length or an angle into information related to time by using a coefficient corresponding to the vehicle speed or the rotational speed of the crank axle 20.

The electronic controller 82 can be configured to control at least one of the motor 42, the transmission 44, and the lamp 70 so as to stop operation of the at least one of the motor 42, the transmission 44, and the lamp 70 based on the voltage level of the battery 40. For example, in a case where the voltage level of the battery 40 becomes less than or equal to a predetermined voltage level, the electronic controller 82 is configured to control at least one of the motor 42, the transmission 44, and the lamp 70 so as to stop operation of the at least one of the motor 42, the transmission 44, and the lamp 70. For example, in a case where the voltage level of the battery 40 becomes less than or equal to the predetermined voltage level, the electronic controller 82 is configured to control at least one of the motor 42, the transmission 44, and the lamp 70 so that the motor 42 stops applying a propulsion force to the human-powered vehicle 10, the predetermined shifting operation is stopped, the transmission 44 stops shifting the transmission ratio, or the lamp 70 is deactivated.

In a case where the electronic controller 82 stops the predetermined shifting operation, for example, the electronic controller 82 does not operate the transmission 44 and does not drive the motor 42 even if the shifting condition and the predetermined first condition are satisfied. In a case where the electronic controller 82 stops shifting the transmission ratio by the transmission 44, for example, the electronic controller 82 does not operate the transmission 44 even if the shifting condition is satisfied.

In a case where the voltage level of the battery 40 becomes less than or equal to the predetermined voltage level, for example, the electronic controller 82 is configured to execute first to fourth processes. For example, the electronic controller 82 is configured to sequentially execute the first to fourth processes in accordance with the voltage level of the battery 40. For example, in a case where the voltage level of the battery 40 becomes less than or equal to a first voltage level, the electronic controller 82 executes the first process. The predetermined voltage level is, for example, the first voltage level. For example, in the first process, the electronic controller 82 controls the motor 42 so that the motor 42 stops applying a propulsion force to the human-powered vehicle 10. For example, in a case where the voltage level of the battery 40 becomes less than or equal to a second voltage level that is less than the first voltage level, the electronic controller 82 executes the second process. For example, in the second processing, the electronic controller 82 controls the motor 42 and the transmission 44 so that the predetermined shifting operation is stopped.

In a case where the voltage level of the battery 40 becomes less than or equal to a third voltage level that is less than the second voltage level, for example, the electronic controller 82 executes the third process. For example, in the third process, the electronic controller 82 controls the transmission 44 so that the transmission 44 stops shifting the transmission ratio. For example, in a case where the voltage level of the battery 40 becomes less than or equal to a fourth voltage level that is less than the third voltage level, the electronic controller 82 executes the fourth process. For example, in the fourth process, the electronic controller 82 deactivates the lamp 70. The predetermined voltage level is, for example, a voltage level of the battery 40 at which the lamp 70 can be illuminated for two hours or longer.

The second process can be omitted. In a case where the second process is omitted, the electronic controller 82 controls the motor 42 so that the motor 42 stops applying a propulsion force to the human-powered vehicle 10 and the shifting control is stopped, for example, in the first process. The second and third processes can be omitted. In a case where the second and third processes are omitted, the electronic controller 82 controls the motor 42 and the transmission 44 so that the motor 42 stops applying a propulsion force to the human-powered vehicle 10, the predetermined shifting operation is stopped, and the transmission 44 stops shifting the transmission ratio, for example, in the first process.

The human-powered vehicle 10 can further include a master unit and at least one slave unit. The master unit includes, for example, the drive unit 48. The at least one slave unit includes, for example, at least one of the transmission 44, the at least one IoT device 68, the lamp 70, an electric adjustable seatpost, an electric suspension, an electric brake, and a cycle computer. The master unit and the at least one slave unit are configured to establish communication with each other through, for example, power line communication (PLC), CAN, or UART. Instead of the drive unit 48, the master unit can include, for example, any one of the transmission 44, the at least one IoT device 68, the lamp 70, an electric adjustable seatpost, an electric suspension, an electric brake, and a cycle computer.

The master unit includes, for example, a master controller. The master controller can be included in the electronic controller 82. Alternatively, the master controller can be separate from the electronic controller 82. The master controller is, for example, configured to transmit a communication signal to the at least one slave unit at intervals of a sixth time period. The communication signal includes, for example, a Packet InterNet Groper (PING) command. The at least one slave unit transmits a response signal to the master unit in response to the communication signal from the master controller.

In a case where the system of the master unit is activated, for example, the master controller is configured to obtain identification information from each connected slave unit. The master controller is, for example, configured to check each connected slave unit in accordance with the identification information of the connected slave unit.

In a case where the human-powered vehicle 10 is traveling and the system of the master unit is active, for example, the master controller is configured to transmit a PING command to each slave unit at intervals of the sixth time period. For example, in a case where the master controller does not receive a response signal from the at least one slave unit, the master controller determines that the communication with the slave unit is disrupted. A case where the communication between the master controller and the slave unit is disrupted includes, for example, a case where the cable connecting the master unit and the at least one slave unit is broken. The master controller determines that the communication with the slave unit is disrupted, for example, in a case where the master controller does not receive a response signal from the at least one slave unit more than once. The master controller determines that the communication with the slave unit is disrupted in accordance with the PING command that is transmitted at intervals of the sixth time period. This allows the master controller to readily recognize that the communication with the slave unit is disrupted. In a case where the human-powered vehicle 10 is stopped, the master controller does not transmit a PING command to the slave unit even if the system is active. This avoids an erroneous determination by the master controller, for example, in a case where the user performs maintenance on the human-powered vehicle 10.

In a case where the master controller determines that the cable is broken, for example, the master controller is configured to control the display unit 66 to show information related to the broken cable on the display unit 66. The information related to the broken cable includes, for example, at least one of a code and a message corresponding to the broken cable. The display unit 66 can issue the information related to the broken cable by a warning sound or the like.

Figure 8:
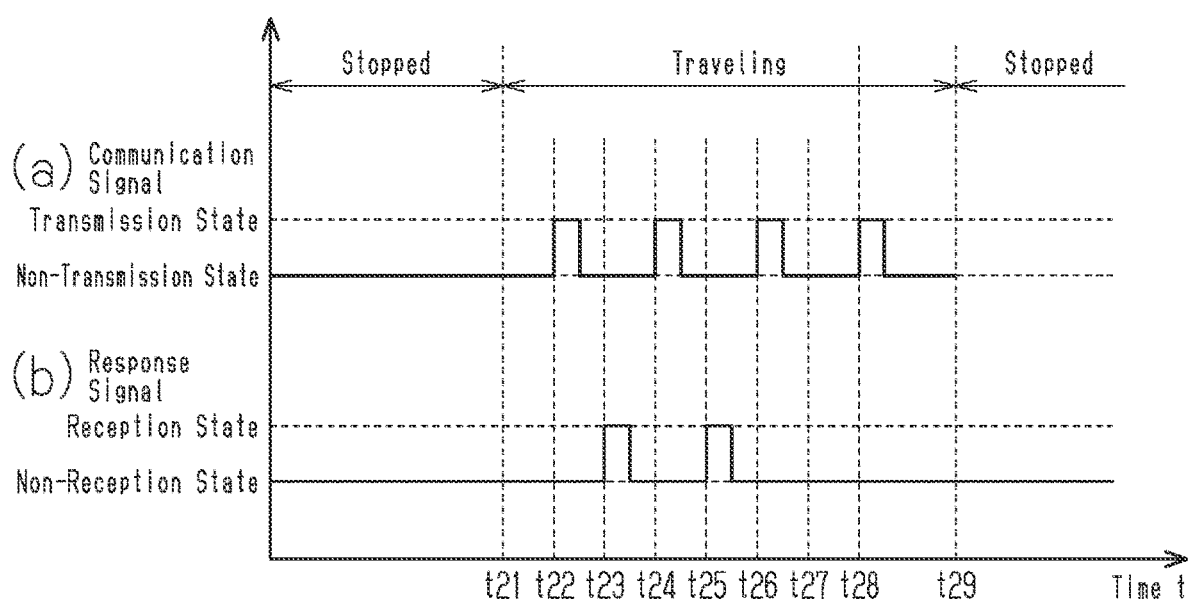
FIG. 8 is a timing diagram showing an example of changes in a communication signal and a response signal in accordance with the first embodiment.

An example of a case where the master controller detects a broken cable will now be described with reference to FIG. 8. Time t21 indicates a time at which the human-powered vehicle 10 starts traveling and the master unit detects that the human-powered vehicle 10 is traveling. The system of the master unit can be activated by operating an operating unit that activates the system. In a case where the system of the master unit is activated and then the master unit detects that the human-powered vehicle 10 is traveling, the master controller starts transmitting a communication signal to the at least one slave unit. Time t22 indicates a time at which a communication signal is transmitted from the master controller to the at least one slave unit. Time t23 indicates a time at which the master controller receives a response signal from the at least one slave unit.

Time t24 indicates a time at which a communication signal is transmitted from the master controller to the at least one slave unit. Time t25 indicates a time at which the master controller receives a response signal from the at least one slave unit. Time t26 indicates a time at which a communication signal is transmitted from the master controller to the at least one slave unit. Time t27 indicates a time at which the cable breaks. Time t28 indicates a time at which a communication signal is transmitted from the master controller to the at least one slave unit.

At time t28, for example, the master controller determines that the communication with the slave unit is disrupted because the master controller did not receive the response signal twice. Time t29 indicates the time at which the human-powered vehicle 10 is stopped and the system is deactivated. The system of the master unit can be deactivated by operating an operation unit that deactivates the system.

Second Embodiment

Figure 9:
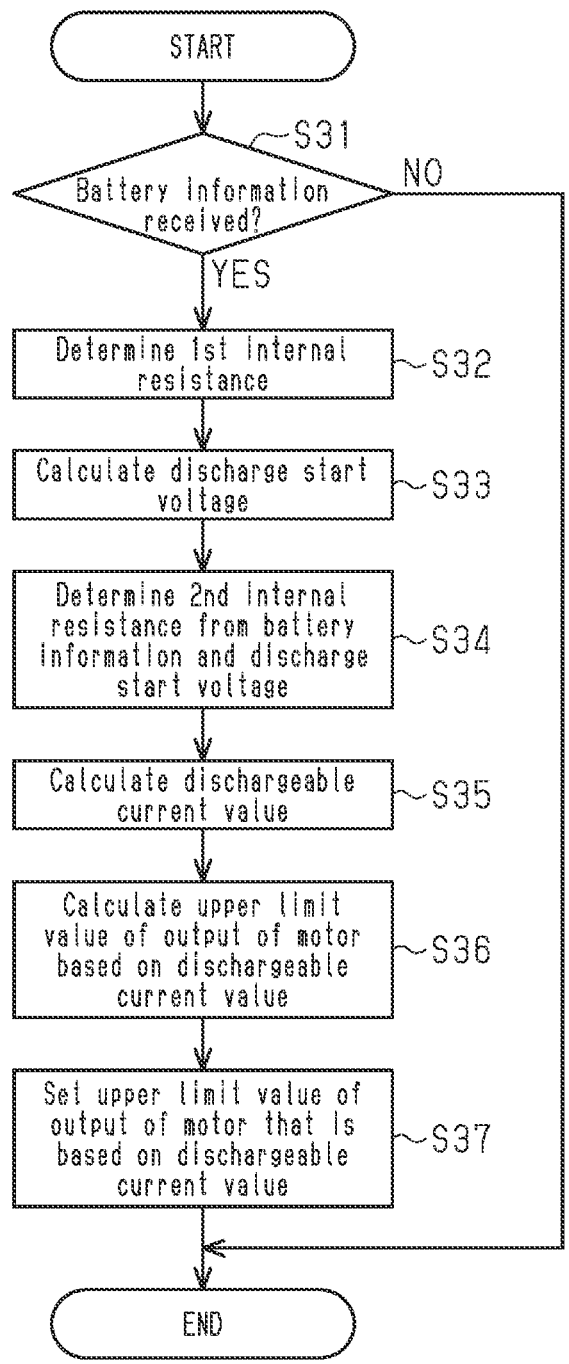
FIG. 9 is a flowchart illustrating a control process executed by an electronic controller to control a motor in accordance with a second embodiment.

The control device 80 for a human-powered vehicle in accordance with a second embodiment will now be described with reference to FIG. 9. Same reference numerals are given to those components of the control device 80 for a human-powered vehicle in the second embodiment that are the same as the corresponding components in the first embodiment. Such components will not be described in detail.

The electronic controller 82 is, for example, configured to control the motor 42 in accordance with battery information related to the battery 40. The electronic controller 82 is, for example, configured to change the upper limit value N in accordance with the battery information. The electronic controller 82 is, for example, configured to calculate the upper limit value N in accordance with the battery information at intervals of a third period. The battery information includes, for example, at least one of the model, the voltage V1, the current A1, the cell type, and the cell temperature of the battery 40.

The battery 40 transmits the battery information to the electronic controller 82, for example, at predetermined time intervals. The electronic controller 82 is, for example, configured to receive the battery information from the battery 40 at the predetermined time intervals. The electronic controller 82 is, for example, configured to compute information related to the performance of the battery 40 from the battery information. The information related to the performance of the battery 40 includes a first internal resistance D1, a second internal resistance D2, a discharge start voltage V2, and a dischargeable current value A2 of the battery 40.

The first internal resistance D1 is determined based on, for example, a table related to the model and the cell temperature of the battery 40. The second internal resistance D2 is determined based on, for example, a table related to the cell temperature and the discharge start voltage V2 of the battery 40. The storage 84 stores the table related to the model and the cell temperature of the battery 40 and the table related to the cell temperature and the discharge start voltage V2 of the battery 40. The discharge start voltage V2 is determined by, for example, Equation (2).

$$V2=V1+(A1 \times D1) \quad \text{Equation (2):}$$

In a case where the system of the electronic controller 82 is activated, the electronic controller 82 sets the discharge start voltage V2 to the voltage V1 obtained from the battery 40 without using Equation (2). Whenever the system is activated, the electronic controller 82 updates the discharge start voltage V2 to the voltage V1 obtained from the battery 40. In Equation (2), mean values of multiple pieces of the battery information transmitted from the battery 40 can be used as the voltage V1 and the current A1. In Equation (2), mean values of five pieces of the battery information transmitted from the battery 40 can be used as the voltage V1 and the current A1. For example, the electronic controller 82 compares the discharge start voltage V2 calculated from the mean value of the battery information with the set discharge start voltage V2, and updates the discharge start voltage V2 in a case where the difference of the set discharge start voltage V2 and the discharge start voltage V2 calculated from the mean value of the battery information is less than a predetermined value.

The dischargeable current value A2 is calculated from, for example, the discharge start voltage V2, the second internal resistance D2, and a lower limit voltage V3 of the battery 40. The lower limit voltage V3 is, for example, between 20 volts and 40 volts, inclusive. The lower limit voltage V3 is, for example, 30 volts. The dischargeable current value A2 is determined by, for example, Equation (3).

$$A2=(V2-V3)/D2 \quad \text{Equation (3):}$$

The electronic controller 82 is, for example, configured to calculate the upper limit value N from the dischargeable current value A2. The upper limit value N is determined by, for example, Equation (4).

$$N=(A2-2)/0.04 \quad \text{Equation (4):}$$

A control process executed by the electronic controller 82 to control the motor 42 in accordance with the battery information will now be described with reference to FIG. 9. For example, in a case where electric power is supplied to the electronic controller 82, the electronic controller 82 starts the process of the flowchart shown in FIG. 9 from step S31. In a case where the process of the flowchart shown in FIG. 9 ends, the electronic controller 82 repeats the process from step S31 in predetermined cycles, for example, until the supply of electric power stops.

In step S31, the electronic controller 82 determines whether the electronic controller 82 receives the battery information from the battery 40. In a case where the electronic controller 82 receives the battery information from the battery 40, the electronic controller 82 proceeds to step S32. In a case where the electronic controller 82 does not receive the battery information from the battery 40, the electronic controller 82 ends processing.

In step S32, the electronic controller 82 determines the first internal resistance D1 and then proceeds to step S33. In step S33, the electronic controller 82 calculates the discharge start voltage V2 and then proceeds to step S34. In step S34, the electronic controller 82 determines the second internal resistance V2 from the battery information and the discharge start voltage D2. Then, the electronic controller 82 proceeds to step S35.

In step S35, the electronic controller 82 calculates the dischargeable current value A2 and then proceeds to step S36. In step S36, the electronic controller 82 calculates the upper limit value N of the output of the motor 42 based on the dischargeable current value A2. Then, the electronic controller 82 proceeds to step S37. In step S37, the electronic controller 82 sets the upper limit value N of the output of the motor 42 that is based on the dischargeable current value A2 and then ends processing. The upper limit value N of the output of the motor 42 is changed in accordance with the internal resistance. This avoids a situation in which the human-powered vehicle 10 starts traveling in a low-temperature environment with a low battery level, and thus the voltage of the battery 40 rapidly decreases and the battery level shown on the display unit 66 becomes zero or the motor 42 stops.

Modifications

The descriptions related to the above embodiments exemplifies, without any intention to limit, applicable forms of a control device for a human-powered vehicle according to the present disclosure. In addition to the embodiments described above, the control device for a human-powered vehicle according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

The electronic controller 82 in accordance with the first and second embodiments can be configured to control the motor 42 so as not to decrease the upper limit value N of the output of the motor 42 in a case where transmission ratio is shifted to the smallest one of the shift stages. If the upper limit value N2 of the output of the motor 42 is equal to the normal upper limit value NA of the output of the motor 42, Table 1 corresponds to a case where the electronic controller 82 controls the motor 42 so as not to decrease the upper limit value N of the output of the motor 42 as the transmission ratio is shifted to the smallest one of the shift stages.

The electronic controller 82 in accordance with the first and second embodiments can be configured to control the motor 42 so as not to decrease the upper limit value N of the output of the motor 42 in a case where transmission ratio is shifted to the second smallest one of the shift stages. If the upper limit value N2 of the output of the motor 42 is equal to the normal upper limit value NA of the output of the motor 42, Table 1 corresponds to a case where the electronic controller 82 controls the motor 42 so as not to decrease the upper limit value N of the output of the motor 42 as the transmission ratio is shifted to the second smallest one of the shift stages.

The electronic controller 82 in accordance with the first and second embodiments can be configured to control the motor 42 so as not to decrease the upper limit value N of the output of the motor 42 in an up-shift operation performed between two predetermined ones of the shift stages. The electronic controller 82 is, for example, configured to control the motor 42 so as not to decrease the upper limit value N of the output of the motor 42 in every up-shift operation. The electronic controller 82 is, for example, configured to control the motor 42 so as not to decrease the upper limit value N of the output of the motor 42 in some up-shift operations. If the upper limit value N2 of the output of the motor 42 is equal to the normal upper limit NA of the output of the motor 42, Table 1 corresponds to a case where the electronic controller 82 is configured to control the motor 42 so as not to decrease the upper limit value N of the output of the motor 42 in some up-shift operations.

The electronic controller 82 in accordance with the first and second embodiments can be configured to control the motor 42 so that the upper limit value N in a down-shift operation performed between two predetermined ones of the shift stages is less than the upper limit value N in an up-shift operation performed between the two predetermined ones of the shift stages.

Table 2 shows the relationship between the shift stages, the upper limit value N of the output of the motor 42 in a down-shift operation, and the upper limit value N of the output of the motor 42 in an up-shift operation. In a case where the shift stage is downshifted from the eleventh stage to the tenth stage, from the tenth stage to the ninth stage, from the ninth stage to the eighth stage, from the eighth stage to the seventh stage, or from the seventh stage to the sixth stage, the electronic controller 82 decreases the upper limit value N of the output of the motor 42 to the upper limit value N5. In a case where the shift stage is downshifted from the sixth stage to the fifth stage, from the fifth stage to the fourth stage, from the fourth stage to the third stage, from the third stage to the second stage, or from the second stage to the first stage, the electronic controller 82 sets the upper limit value N of the output of the motor 42 to the upper limit value N2. As long as the upper limit value N5 of the output of the motor 42 is less than the upper limit value N2, the upper limit value N5 can be the same as or differ from the upper limit values N1, N3, and N4.

In a case where the shift stage is upshifted from the tenth stage to the eleventh stage, from the ninth stage to the tenth stage, from the eighth stage to the ninth stage, or from the seventh stage to the eighth stage, the electronic controller 82 decreases the upper limit value N of the output of the motor 42 to the upper limit value N6. In a case where the shift stage is upshifted from the sixth stage to the seventh stage, from the fifth stage to the sixth stage, from the fourth stage to the fifth stage, from the third stage to the fourth stage, from the second stage to the third stage, or from the first stage to the second stage, the electronic controller 82 sets the upper limit value N to the upper limit value N2. As long as the upper limit value N6 of the output of the motor 42 is less than the upper limit value N2, the upper limit value N6 can be the same as or differ from the upper limit values N1, N3, N4, and N5.

In Table 2, in a case where the two predetermined ones of the shift stages include, for example, the sixth stage and seventh stage, the electronic controller 82 is configured to set the upper limit value N of the output of the motor 42 in a down-shift operation to be less than the upper limit value N of the output of the motor 42 in an up-shift operation.

TABLE 2

| Shift Stage | 11 | 10 | 9 | 8 | 7 | 6 | 5 | 4 | 3 | 2 | 1 |
|---|---|---|---|---|---|---|---|---|---|---|---|
| Upper Limit Value N in Down-Shift Operation | | | N5 | | | | | | N2 | | |
| Upper Limit Value N in Up-Shift Operation | | | N6 | | | | | | N2 | | |

The shift stages can include two first predetermined shift stages that differ in the transmission ratio by one stage and two second predetermined shift stages that differ in the transmission ratio by one stage. In the present modification, for example, the electronic controller 82 controls the motor 42 so that the upper limit value N in an up-shift operation performed between the two first predetermined shift stages is less than the upper limit value N in a down-shift operation performed between the two first predetermined shift stages. For example, the electronic controller 82 is configured to control the motor 42 so that the upper limit value N in a down-shift operation performed between the two second predetermined shift stages is less than the upper limit value N in an up-shift operation performed between the two second predetermined shift stages. The transmission ratio of each of the two first predetermined shift stages is, for example, less than the transmission ratio of each of the two second predetermined shift stages.

Table 3 shows the relationship between the shift stages, the upper limit value N in a down-shift operation, and the upper limit value N in an up-shift operation. In a case where the shift stage is downshifted from the eleventh stage to the tenth stage, from the tenth stage to the ninth stage, or from the ninth stage to the eighth stage, the electronic controller 82 decreases the upper limit value N of the output of the motor 42 to the upper limit value N7. In a case where the shift stage is downshifted from the eighth stage to the seventh stage, the electronic controller 82 sets the upper limit value N of the output of the motor 42 to the upper limit value N8. In a case where the shift stage is downshifted from the seventh stage to the sixth stage, from the sixth stage to the fifth stage, from the fifth stage to the fourth stage, from the fourth stage to the third stage, from the third stage to the second stage, or from the second stage to the first stage, the electronic controller 82 sets the upper limit value N of the output of the motor 42 to the upper limit value N2.

In a case where the shift stage is upshifted from the tenth stage to the eleventh stage, from the ninth stage to the tenth stage, from the eighth stage to the ninth stage, from the seventh stage to the eighth stage, from the sixth stage to the seventh stage, or from the fifth stage to the sixth stage, the electronic controller 82 decreases the upper limit value N of the output of the motor 42 to the upper limit value N9. In a case where the shift stage is upshifted from the fourth stage to the fifth stage, from the third stage to the fourth stage, from the second stage to the third stage, or from the first stage to the second stage, the electronic controller 82 sets the upper limit value N of the output of the motor 42 to the upper limit value N2. The upper limit value N7 of the output of the motor 42 is less than the upper limit value N9. The upper limit value N9 is less than the upper limit value N8. The upper limit value N8 of the output of the motor 42 is less than the upper limit value N2.

In Table 3, in a case where the two first predetermined shift stages include, for example, the fifth and sixth stages or the sixth and seventh stages, the upper limit value N of the output of the motor 42 in an up-shift operation is less than the upper limit value N in a down-shift operation. In a case where the two second predetermined shift stages include, for example, the eighth and ninth stages, the ninth and tenth stages, or the tenth and eleventh stages, the upper limit value N of the output of the motor 42 in a down-shift operation is less than the upper limit value N of the output of the motor 42 in an up-shift operation. For example, in a case where the two first predetermined shift stages include the fifth and sixth stages, or the sixth and seventh stages, and the two second predetermined shift stages include the eighth and ninth stages, the ninth and tenth stages, or the tenth and eleventh stages, the transmission ratio in each of the two first predetermined shift stages is, for example, less than the transmission ratio in each of the two second predetermined shift stages.

TABLE 3

| Shift Stage | 11 | 10 | 9 | 8 | 7 | 6 | 5 | 4 | 3 | 2 | 1 |
|---|---|---|---|---|---|---|---|---|---|---|---|
| Upper Limit Value N in Down-Shift Operation | | N7 | | N8 | | | | N2 | | | |
| Upper Limit Value N in Up-Shift Operation | | | | N9 | | | | N2 | | | |

The electronic controller 82 can combine the control in the first embodiment and the control in the second embodiment.

As long as the control device 80 in accordance with the first and second embodiments is configured as described below, any other configuration can be omitted. The control device 80 includes the electronic controller 82 configured to control the motor 42. The electronic controller 82 is configured to decrease the upper limit value N of the output of the motor 42 in an up-shift operation that increases the transmission ratio by shifting from one of the shift stages to another one of the shift stages. The electronic controller 82 is configured to decrease the upper limit value N in a down-shift operation that decreases the transmission ratio by shifting from one of the shift stages to another one of the shift stages. The electronic controller 82 is configured to control the motor 42 so that the upper limit value N in an up-shift operation performed between two predetermined ones of the shift stages that differ in the transmission ratio by one stage differs from the upper limit value N in a down-shift operation performed between the two predetermined ones of the shift stages.

As long as the electronic controller 82 in accordance with the first and second embodiments is configured as described below, any other configuration can be omitted. The control device 80 includes the electronic controller 82 configured to control the motor 42. The electronic controller 82 is configured to decrease the upper limit value N of the output of the motor 42 in a case where the transmission ratio is increased in the first group of at least two of the shift stages by changing one of the shift stages in the first group to another one of the shift stages in the first group. The electronic controller 82 is configured to decrease the upper limit value N of the output of the motor 42 in a case where the transmission ratio is decreased in the second group of at least two of the shift stages by changing one of the shift stages in the second group to another one of the shift stages in the second group. At least one of the at least two shift stages in the first group differs from at least one of the at least two shift stages in the second group.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Ordinal numerals such as "first", "second", and "third" are used in this disclosure only to distinguish members from one another and are not intended to have a special meaning.

What is claimed is:

1. A control device for a human-powered vehicle including a motor that applies a propulsion force to the human-powered vehicle and a transmission that shifts a transmission ratio of the human-powered vehicle between a plurality of shift stages, the control device comprising:
   an electronic controller configured to control the motor,
   the electronic controller being configured to decrease an upper limit value of an output of the motor in an up-shift operation that increases the transmission ratio by shifting from one of the shift stages to another one of the shift stages,
   the electronic controller being configured to decrease the upper limit value in a down-shift operation that decreases the transmission ratio by shifting from one of the shift stages to another one of the shift stages, and
   the electronic controller being configured to control the motor so that the upper limit value in the up-shift operation performed between two predetermined ones of the shift stages that differ in the transmission ratio by one stage differs from the upper limit value in the down-shift operation performed between the two predetermined ones of the shift stages.

2. The control device according to claim 1, wherein the electronic controller is configured to control the motor so as not to decrease the upper limit value in a case where the transmission ratio is shifted to a smallest one of the shift stages.

3. The control device according to claim 1, wherein the electronic controller is configured to control the motor so as not to decrease the upper limit value in the up-shift operation performed between the two predetermined ones of the shift stages.

4. The control device according to claim 1, wherein the electronic controller is configured to control the motor so that the upper limit value in the up-shift operation performed between the two predetermined ones of the shift stages is less than the upper limit value in the down-shift operation performed between the two predetermined ones of the shift stages.

5. The control device according to claim 1, wherein the electronic controller is configured to control the motor so that the upper limit value in the down-shift operation performed between the two predetermined ones of the shift stages is less than the upper limit value in the up-shift operation performed between the two predetermined ones of the shift stages.

6. The control device according to claim 1, wherein: the shift stages include two first predetermined shift stages that differ in the transmission ratio by one stage and two second predetermined shift stages that differ in the transmission ratio by one stage;
the electronic controller is configured to control the motor so that the upper limit value in the up-shift operation performed between the two first predetermined shift stages is less than the upper limit value in the down-shift operation performed between the two first predetermined shift stages; and
the electronic controller is configured to control the motor so that the upper limit value in the down-shift operation performed between the two second predetermined shift stages is less than the upper limit value in the up-shift operation performed between the two second predetermined shift stages.

7. The control device according to claim 6, wherein the transmission ratio of each of the two first predetermined shift stages is less than the transmission ratio of each of the two second predetermined shift stages.

8. The control device according to claim 1, wherein the electronic controller is configured to vary the upper limit value and decrease the output of the motor by controlling the motor so as to gradually decrease the output of the motor over a first period.

9. The control device according to claim 8, wherein: the first period is a first time period; and
the first time period is 0.05 seconds or greater and 0.3 seconds or less.

10. The control device according to claim 1, wherein the electronic controller is configured to control the motor so that in a case where the upper limit value is decreased to decrease the output of the motor, if a predetermined period elapses after decreasing the output of the motor, the upper limit value is increased to the upper limit value that was set until immediately before the upper limit value was decreased.

11. The control device according to claim 10, wherein: the predetermined period includes a period during which a rotational amount of a wheel of the human-powered vehicle reaches a predetermined rotational amount; and
the predetermined rotational amount is 30 degrees or greater and less than 460 degrees.

12. The control device according to claim 10, wherein the electronic controller is configured to increase the upper limit value and increase the output of the motor by gradually increasing the output of the motor over a second period.

13. The control device according to claim 12, wherein: the second period is a second time period; and
the second time period is 0.05 seconds or greater and 0.2 seconds or less.

14. The control device according to claim 10, wherein: the transmission includes rotational bodies and a derailleur that is configured to change the shift stage by moving a linking body from one of the rotational bodies to another one of the rotational bodies;
at least one of the rotational bodies includes at least two shifting facilitation regions in a circumferential direction;
the at least two shifting facilitation regions facilitate movement of the linking body with the derailleur from the one of the rotational bodies to the other one of the rotational bodies;
the predetermined period is determined in accordance with a length of where the linking body engages the other one of the rotational bodies and a distance from one of the at least two shifting facilitation regions to an adjacent one of the at least two shifting facilitation regions.

15. The control device according to claim 1, wherein the electronic controller is configured to vary the upper limit value by controlling the motor so as to decrease the upper limit value as a human driving force applied to the human-powered vehicle increases.

16. The control device according to claim 1, wherein the electronic controller is configured to control the transmission so that the transmission starts an action in accordance with a peak time of a human driving force applied to the human-powered vehicle.

17. The control device according to claim 16, wherein: the transmission includes rotational bodies and a derailleur that is configured to shift the transmission ratio by moving a linking body from one of the rotational bodies to another one of the rotational bodies;
at least one of the rotational bodies includes at least two shifting facilitation regions in a circumferential direction;
the at least two shifting facilitation regions facilitate movement of the linking body with the derailleur from the one of the rotational bodies to the other one of the rotational bodies;
the electronic controller is configured to control the transmission so as to start an action of the transmission in accordance with the peak time and a distance from one of the at least two shifting facilitation regions to an adjacent one of the at least two shifting facilitation regions; and
the electronic controller is configured to control the motor so as to decrease the upper limit value in accordance with the peak time and the distance.

18. The control device according to claim 17, wherein the derailleur includes a rear derailleur.

19. A control device for a human-powered vehicle including a motor that applies a propulsion force to the human-powered vehicle and a transmission that shifts a transmission ratio of the human-powered vehicle between a plurality of shift stages, the control device comprising:
an electronic controller configured to control the motor,
the electronic controller being configured to decrease an upper limit value of an output of the motor in a case where the transmission ratio is increased in a first group of at least two of the shift stages by changing one of the shift stages in the first group to another one of the shift stages in the first group,
the electronic controller being configured not to decrease the upper limit value in a case where the transmission ratio is increased by changing the one of the shift stages in the first group to one of the shift stages outside the first group,
the electronic controller being configured to decrease the upper limit value of the output of the motor in a case where the transmission ratio is decreased in a second group of at least two of the shift stages by changing one of the shift stages in the second group to another one of the shift stages in the second group,
the electronic controller being configured not to decrease the upper limit value in a case where the transmission ratio is increased by changing one of the shift stages in the second group to one of the shift stages outside the second group, and
at least one of the at least two shift stages in the first group differs from at least one of the at least two shift stages in the second group.

* * * * *